United States Patent
Kondo et al.

(10) Patent No.: US 8,406,823 B2
(45) Date of Patent: Mar. 26, 2013

(54) POWER TRANSMISSION CONTROL DEVICE, POWER TRANSMISSION DEVICE, POWER RECEPTION CONTROL DEVICE, POWER RECEPTION DEVICE, AND ELECTRONIC APPARATUS

(75) Inventors: Yoichiro Kondo, Chino (JP); Takahiro Kamijo, Fujimi-cho (JP); Kota Onishi, Nagoya (JP); Masayuki Kamiyama, Nagoya (JP); Nobutaka Shiozaki, Nagoya (JP)

(73) Assignee: Seiko Epson Corporation, Tokyo (JP)

( * ) Notice: Subject to any disclaimer, the term of this patent is extended or adjusted under 35 U.S.C. 154(b) by 853 days.

(21) Appl. No.: 12/489,937

(22) Filed: Jun. 23, 2009

(65) Prior Publication Data
US 2009/0325651 A1    Dec. 31, 2009

(30) Foreign Application Priority Data
Jun. 25, 2008  (JP) ................. 2008-165924

(51) Int. Cl.
*H04M 1/00* (2006.01)

(52) U.S. Cl. .......... 455/573; 455/522; 455/69; 455/574; 320/115; 323/355; 379/443; 307/104; 307/140

(58) Field of Classification Search ................ 455/573, 455/522, 69, 403, 24, 550.1, 556.1, 572, 455/574; 320/108, 109, 115; 323/355; 379/443; 370/104, 140, 150
See application file for complete search history.

(56) References Cited

U.S. PATENT DOCUMENTS

| | | | | |
|---|---|---|---|---|
| 7,109,682 | B2 * | 9/2006 | Takagi et al. .............. | 320/108 |
| 7,233,137 | B2 * | 6/2007 | Nakamura et al. .......... | 323/355 |
| 8,054,036 | B2 * | 11/2011 | Onishi et al. .............. | 320/108 |
| 2004/0145342 | A1 * | 7/2004 | Lyon ..................... | 320/108 |
| 2005/0068019 | A1 * | 3/2005 | Nakamura et al. .......... | 323/355 |
| 2009/0322280 | A1 * | 12/2009 | Kamijo et al. ............ | 320/108 |
| 2009/0322281 | A1 * | 12/2009 | Kamijo et al. ............ | 320/108 |
| 2010/0013319 | A1 * | 1/2010 | Kamiyama et al. .......... | 307/104 |
| 2010/0013322 | A1 * | 1/2010 | Sogabe et al. ............ | 307/104 |

FOREIGN PATENT DOCUMENTS

| | | |
|---|---|---|
| JP | A-10-094199 | 4/1998 |
| JP | A-2006-060909 | 3/2006 |
| JP | A-2006-141170 | 6/2006 |
| JP | A-2006-517378 | 7/2006 |
| WO | WO 2004/068726 A2 | 8/2004 |

* cited by examiner

*Primary Examiner* — Shaima Q Aminzay
(74) *Attorney, Agent, or Firm* — Oliff & Berridge, PLC

(57) ABSTRACT

A power transmission control device is provided in a contactless power transmission system that supplies electric power to a load of a power reception device such that a primary coil and a secondary coil are electromagnetically coupled to each other so as to transmit the electric power to the power reception device from the power transmission device. The power transmission control device includes a controller that controls the power transmission control device, and a storage section that stores information about a power transmitting side coil. The controller performs a collation process for collating the information about the power transmitting side coil with information about a power receiving side coil received from the power reception device, and determines whether or not the information about the power transmitting side coil is compatible with the information about the power receiving side coil.

19 Claims, 15 Drawing Sheets

PRIMARY COIL SECONDARY COIL

COIL XA
(CID = IDX)

COIL X
(CID = IDX)

COIL XB
(CID = IDX)

COIL XC
(CID = IDX)

COIL YA
(CID = IDY)

COIL Y
(CID = IDY)

COIL YB
(CID = IDY)

COIL YC
(CID = IDY)

POWER TRANSMISSION CONTROL DEVICE, POWER TRANSMISSION DEVICE, POWER RECEPTION CONTROL DEVICE, POWER RECEPTION DEVICE, AND ELECTRONIC APPARATUS

This application claims priority to JP 2008-165924 filed in Japan on Jun. 25, 2008, the entire disclosures of which is hereby incorporated by reference in its entirety.

BACKGROUND

1. Technical Field

The present invention relates to a power transmission control device, a power transmission device, a power reception control device, a power reception device, and an electronic apparatus.

2. Related Art

In recent years, contactless electric power transmission (non-contact electric power transmission) technique that makes it possible to perform transmission of electric power by utilizing electromagnetic induction without a metallic contact has attracted attention. As an application of the above contactless electric power transmission technique, a technique of charging a mobile phone or a home-house device (for example, a cordless handset for a telephone) has been heretofore proposed.

JP-A-2006-60909 is an example of the related art. In the description, an authentication code is exchanged between a power reception device (at a secondary side) and a power transmission device (at a primary side) to achieve identification (ID) authentication, thereby detecting interposition of a foreign object. JP-A-10-94199 is another example of the related art. In the description, a power supply control system is disclosed that collects information about consumed electric power of an electric apparatus, determines whether or not the power can be supplied to the electric apparatus within an allowable electric power range and permits power dissipation of the electric apparatus which is determined to be capable of receiving electric power in order to prevent occurrence of a case that a circuit breaker turns off electric power when electric apparatuses are concurrently used.

In the first example of the related art, it is only assumed that a power transmission device and a power reception device are in one-on-one correspondence. Namely, the power transmission device only determines whether a device ID received from the power reception device is adequate or not. As a result, such a problem may arise that adequate contactless electric power transmission is not performed in a case where there are a plurality of kinds of power reception devices.

SUMMARY

An advantage of some aspects of the invention is that it provides a power transmission control device, a power transmission device, a power reception control device, a power reception device, and an electronic apparatus each having high versatility.

A power transmission control device according to a first aspect of the invention, is provided to a power transmission device in a contactless power transmission system that supplies electric power to a load of a power reception device such that a primary coil and a secondary coil are electromagnetically coupled to each other so as to transmit the electric power to the power reception device from the power transmission device. The power transmission control device includes a controller that controls the power transmission control device, and a storage section that stores information about a power transmitting side coil. The power reception device transmits information about a power receiving side coil to the power transmission device. The controller performs a collation process for collating the information about the power transmitting side coil with information about the power receiving side coil received from the power reception device, and determines whether or not the information about the power transmitting side coil is compatible with the information about the power receiving side coil.

With the above configuration, when the power transmission device receives the information about the power receiving side coil from the power reception device, the collation process for collating the information about the power transmitting side coil with the information about the power receiving side coil received from the power reception device is performed, thereby determining whether or not the information about the power transmitting side coil is compatible with the information about the power receiving side coil. As a result, it is possible to perform various operations on the basis of the determination result in the collation process between the information about the power transmitting side coil and the information about the power receiving side coil. Consequently, contactless transmission of electric power by various combinations between, for example, primary coils and secondary coils can be realized, which makes it possible to provide the highly versatile power transmission control device.

In the power transmission control device according to the first aspect of the invention, the storage section preferably stores first identification information about the primary coil provided to the power transmission device as the information about the power transmitting side coil. The power reception device transmits the first identification information to which the power reception device is adaptable, to the power transmission device as the information about the power receiving side coil. The controller preferably determines that the information about the power transmitting side coil is compatible with the information about the power receiving side coil, in a case where the information about the power transmitting side coil is matched to the information about the power receiving side coil.

With the above configuration, since it is not necessary for the power transmission device to store the identification information about the secondary coil, the management of the information about the coils can be simplified. In addition, the matching property of the information about coils is determined on the basis of the determination of whether or not the information about the power transmitting side coil as the identification information about the primary coil is matched to the information about the power receiving side coil as the identification information about the primary coil to which the power reception device is adaptable, it is possible to realize the adequate contactless transmission of electric power.

In the power transmission control device according to the first aspect of the invention, the controller preferably transmits the information about the power transmitting side coil stored in the storage section to the power reception device in a case where it is determined that the information about the power transmitting side coil is compatible with the information about the power receiving side coil.

With the above configuration, the power reception device can perform the collation process by confirming the information about the power transmitting side coil received from the power transmission device.

In the power transmission control device according to the first aspect of the invention, the controller preferably performs detecting of a foreign object before transmitting the information about the power transmitting side coil to the power reception device, and preferably transmits the information about the power transmitting side coil to the power reception device in a case where a foreign object is not detected.

With the above configuration, since the controller performs detecting of a foreign object in the event of transmitting or receiving the information about the coil, more adequate contactless transmission of electric power can be realized.

In the power transmission control device according to the first aspect of the invention, the storage section preferably stores a plurality of pieces of information about the power transmitting side coil, and the controller preferably transmits, to the power reception device, the information about the coil that is selected from the plurality of pieces of information about the power transmitting side coil and is compatible with the information about the power receiving side coil.

With the above configuration, it is possible to increase variation in compatibility between the primary coil and the secondary coil so that it is possible to establish a flexible system.

In the power transmission control device according to the first aspect of the invention, the controller preferably performs a collation process for collating the information about the power transmitting side coil with the information about the power receiving side coil before starting normal transmission of electric power to the power reception device from the power transmission device, and preferably starts the normal transmission of electric power in a case where it is determined that the information about the power transmitting side coil is compatible with the information about the power receiving side coil.

With the above configuration, it is possible to prevent the normal transmission of electric power from being performed under condition that the information about the coils is not compatible with each other so that more adequate contactless transmission of electric power can be realized.

A power transmission device according to a second aspect of the invention, includes the power transmission control device according to the first aspect of the invention, and a power transmission section that generates an alternating current (AC) voltage and supplies the AC voltage to the primary coil.

An electronic apparatus according to a third aspect of the invention, includes the power transmission device according to the second aspect of the invention.

A power reception control device according to a fourth aspect of the invention, is installed in a contactless power transmission system that causes a power transmission device to transmit electric power to a power reception device so as to supply the electric power to a load of the power reception device by electromagnetically coupling a primary coil to a secondary coil. The power reception control device includes a controller controlling the power reception control device and a storage section storing information about a power receiving side coil. The controller transmits the information about the power receiving side coil stored in the storage section to the power transmission device.

With the above configuration, the information about the power receiving side coil is stored in the storage section and the stored information about the power receiving side coil is transmitted to the power transmission device. As a result, the power transmission device can perform various operations on the basis of the received information about the power receiving side coil. Accordingly, contactless transmission of electric power by various combinations between, for example, the primary coils and the secondary coils can be realized, thereby providing the highly versatile power reception control device.

In the power reception control device according to the fourth aspect of the invention, the storage section preferably stores identification information about the primary coil as the information about the power receiving side coil to which the power reception device is adaptable, and the controller preferably transmits the identification information about the primary coil to the power transmission device.

With the above configuration, it is not necessary for the power transmission device to store the identification information about the secondary coil, thereby simplifying the management of the coils. In addition, since the identification information about the primary coil to which the power reception device is adaptable, is transmitted to the power transmission device as the information about the power receiving side coil so as to perform a collation process, it is possible to realize the adequate contactless transmission of electric power.

In the power reception control device according to the fourth aspect of the invention, in a case where each of first to N-th types of secondary coils is adaptable to a first type of primary coil and the secondary coil of the power reception device is either one of the first to N-th types of secondary coils, the controller preferably transmits the identification information about first type of the primary coil as the information about the power receiving side coil.

With the above configuration, it is possible to realize the adequate contactless transmission of electric power corresponding to the various types of secondary coils such as the first to N-th types of secondary coils.

In the power reception control device according to the fourth aspect of the invention, the controller preferably performs a collation process for collating information about a power transmitting side coil with the information about the power receiving side coil in a case where the controller receives the information about the power transmitting side coil from the power transmission device, and preferably determines whether or not the information about the power transmitting side coil is compatible with the information about the power receiving side coil.

With the above configuration, the power reception control device can perform various operations in accordance with the determination result of the collation process between the information about the power transmitting side coil and the information about the power receiving side coil so that it is possible to provide the highly versatile power reception control device.

In the power reception control device according to the fourth aspect of the invention, the controller preferably determines whether or not a positional relationship between the primary coil and the secondary coil is adequate, and preferably transmits the information about the power receiving side coil to the power transmission device in a case where it is determined that the positional relationship is adequate.

With the above configuration, since the information about the power receiving side coil is transmitted to the power transmitting side under a condition that the positional relationship between the primary coil and the secondary coil is adequate, it is possible to prevent a waste collation process between the information about the coils from being performed at the power transmitting side.

In the power reception control device according to the fourth aspect of the invention, the controller preferably transmits the information about the power receiving side coil to the power transmission device before normal transmission of electric power to the power reception device from the power transmission device is started.

With the above configuration, it is possible to prevent the normal transmission of electric power from being performed under condition that the power transmission device does not confirm the compatibility between the information about the coils so that more adequate contactless transmission of electric power can be realized.

In the power reception control device according to the fourth aspect of the invention, the power reception device preferably includes a coil unit having the secondary coil mounted thereon and a control unit having the power reception control device mounted thereon. The coil unit is preferably provided with a coil information recording section having the information about the power receiving side coil recorded therein, and the controller preferably transmits the information about the power receiving side coil recorded in the coil information recording section to the power transmission device.

With the above configuration, it is possible to efficiently install the power reception device to an electronic apparatus and to prevent wrong information about the coil from being transmitted to the power transmission device.

A power reception device according to a fifth aspect of the invention, includes the power reception control device according to the first aspect of the invention, and a power reception section that converts an induction voltage of the secondary coil to a direct current (DC) voltage.

A power reception device according to a sixth aspect of the invention, is installed in a contactless power transmission system that transmits electric power to a power reception device from a power transmission device to supply the electric power to a load of the power reception device by electromagnetically coupling a primary coil to a secondary coil. The power reception device includes a coil unit having the secondary coil mounted thereon, a control unit having the power reception control device mounted thereon, and a coil information recording section that has information about a power receiving side coil recorded therein and is provided to the coil unit. The power reception control device transmits the information about the power receiving side coil recorded in the coil information recording section to the power transmission device.

As described above, in a case where the coil unit and the control unit in the power reception device are independently constituted by different components, it is possible to efficiently install the power reception device in an electronic apparatus. In addition, since the information about the power receiving side coil recorded in the coil information recording section of the coil unit is transmitted to the power transmission device, it is possible to prevent wrong information about the coil from being transmitted to the power transmission device.

In the power reception device according to the sixth aspect of the invention, identification information about the primary coil to which the power reception device is adaptable, is preferably recorded in the coil information recording section as the information about the power receiving side coil, and the power reception control device preferably transmits, to the power transmission device, the identification information about the primary coil to which the power reception device is adaptable.

With the above configuration, since the power reception device can transmit the identification information about the primary coil to which the power reception device is adaptable, to the power transmission device as the information about the power receiving side coil, the power transmission device can perform a collation process by using the identification information.

In addition, the invention relates to an electronic apparatus including anyone of the above described power reception devices, and the load supplied with electric power from the power reception device.

BRIEF DESCRIPTION OF THE DRAWINGS

The invention will be described with reference to the accompanying drawings, wherein like numbers reference like elements.

DESCRIPTION OF EXEMPLARY EMBODIMENTS

The preferred embodiments according to the invention will be described with reference to the accompanying drawings. It should be noted that embodiments described below do not limit the spirit or scope of the invention defined by the appended claims and all the structures in the embodiments described below are not indispensable for solving means of the invention.

1. Electronic Apparatus

Figure 1A:
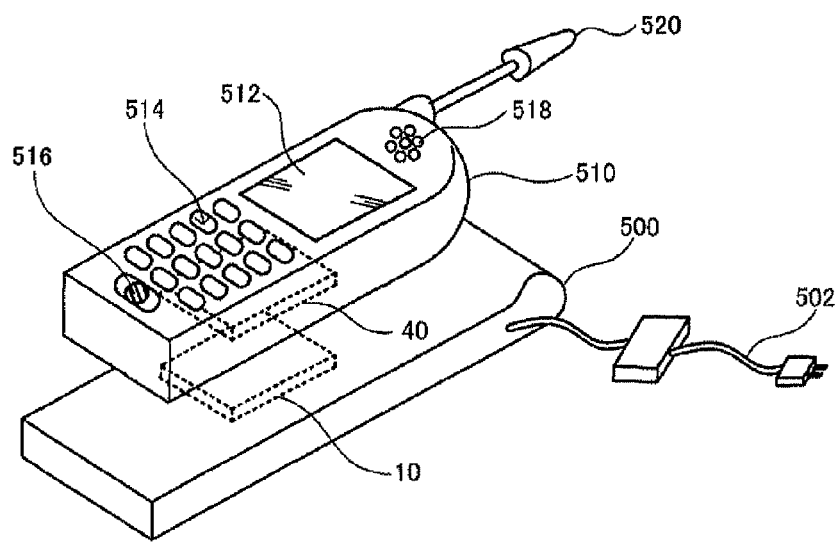
FIGS. 1A, 1B and 1C are explanatory views illustrating a contactless power transmission system according to an embodiment of the invention.

FIG. 1A is a schematic view showing an electronic apparatus to which a contactless electric power transmission technique is applied. A charging device (cradle) 500 as an electronic apparatus has a power transmission device 10. A mobile phone 510 as an electronic apparatus has a power reception device 40. The mobile phone 510 includes a display section 512 such as an LCD, an operation section 514 constituted by a button and the like, a microphone 516 (a sound input section), a speaker 518 (a sound output section) and an antenna 520.

Electric power is supplied to the charging device 500 via an AC adapter 502, and the electric power is transmitted to the power reception device 40 from the power transmission device 10 by contactless transmission of electric power. With this configuration, charging of a battery in the mobile phone 510 and operation of a device in the mobile phone 510 can be carried out.

The electronic apparatus to which the embodiment is adopted is not limited to the mobile phone 510. The embodiment can be adopted to various electronic apparatuses that include, for example, a wrist watch, a cordless phone, a shaver, an electric toothbrush, a wrist computer, a handy terminal device, a mobile information terminal device, an electric bicycle and an IC card.

Figure 1B:
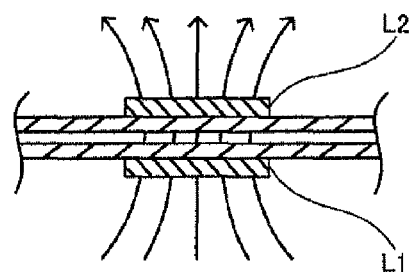

FIG. 1B is a schematic view typically showing a coupling state between the power transmission device 10 and the power reception device 40. The transmission of the electric power from the power transmission device 10 to the power reception device 40 is performed such that a primary coil (a power transmission coil) L1 provided in the power transmission device 10 and a secondary coil L2 (a power reception coil) L2 provided in the power reception device 40 are electromagnetically coupled to each other to form an electric power transformer. With this configuration, transmission of electric power in a non-contact manner can be performed.

In FIG. 1B, each of the primary coil L1 and the secondary coil L2 is a flat coil with an air core formed such that a coil wire is spirally wound on a plane. However, a shape or a structure of the coil of the embodiment is not limited to the above type, and there are no restrictions on the shape and the structure as long as the transmission of electric power can be performed by the electromagnetic coupling between the primary coil L1 and the secondary coil L2.

Figure 1C:
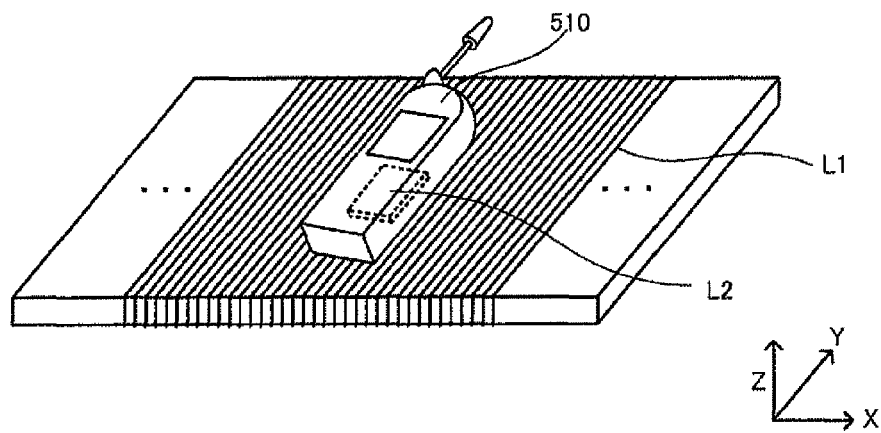

FIG. 1C is a schematic view showing an example of the primary coil L1. As shown in FIG. 1C, the primary coil L1 is formed such that a coil wire is spirally wound around a magnetic core about an X axis. The secondary coil L2 provided in the mobile phone 510 is formed similarly to the above. The embodiment is applicable to the coil shown in FIG. 1C. In the case of FIG. 1C, it is possible to combine a coil formed by winding a coil wire about a Y axis in addition to the primary coil L1 or the secondary coil L2 which is formed by winding the coil wire about the X axis.

2. Power Transmission Device and Power Reception Device

Figure 2:
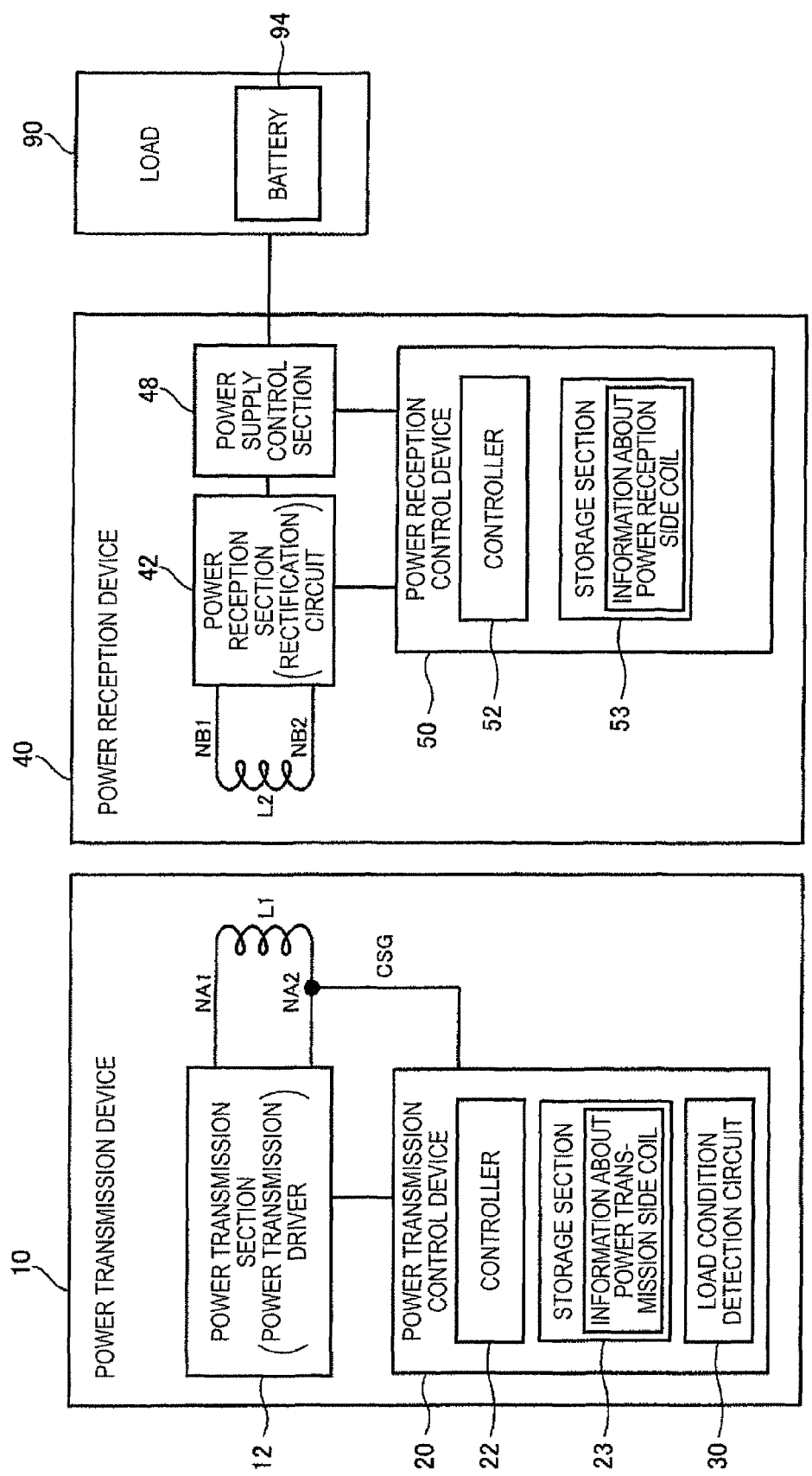
FIG. 2 is a block diagram showing a structure of a contactless power transmission system having a power transmission device, a power transmission control device, a power reception device and a power reception control device according to the invention.

FIG. 2 is a block diagram showing a structure of a contactless power transmission system having the power transmission device 10, a power transmission control device 20, the power reception device 40 and a power reception device 50. An electronic apparatus at a power transmitting side such as the charging device 500 shown in FIG. 1A includes the power transmission device 10 shown in FIG. 2. An electronic apparatus at a power receiving side such as the mobile phone 510 can include the power reception device 40 and a load 90 (a main load). With the configuration shown in FIG. 2, it is possible to realize the contactless power transmission system that transmits electric power from the power transmission device 10 to the power reception device 40 so as to supply the electric power to the load 90 while, for example, electromagnetically coupling the primary coil L1 to the secondary coil L2.

The power transmission device 10 (a power transmission module, a primary module) may includes the primary coil L1, a power transmission section 12 and the power transmission control device 20. The structure of the power transmission device 10 or the power transmission control device 20 is not limited to the structure shown in FIG. 2. A part (e.g., the primary coil) of the components of the devices can be omitted, an additional component (e.g., a waveform monitor circuit) can be provided, or a connection relationship can be changed, and thus, various modifications can be made.

The power transmission section 12 is adapted to generate an alternating current (AC) voltage and to supply it to the primary coil L1. To be specific, the power transmission section 12 generates an AC voltage having a prescribed frequency while transmitting electric power and generates an AC voltage having a frequency varied depending on data while transmitting the data, and then the power transmission section 12 supplies the AC voltage to the primary coil L1. The power transmission section 12 preferably includes, for example, a first power transmission driver for driving one end of the primary coil L1, a second power transmission driver for driving the other end of the primary coil L1 and at least one capacitor forming a resonant circuit together with the primary coil L1. Each of the first and second power transmission drivers included in the power transmission section 12 is an inverter circuit (a buffer circuit) composed of, for example, a power MOS (Metal Oxide Semiconductor) transistor and is controlled by the power transmission control device 20.

The primary coil L1 (a power transmitting side coil) is electromagnetically coupled to the secondary coil L2 (a power receiving side coil) to form the electric power transformer. When, for example, transmission of electric power is required, the mobile phone 510 is placed on the charging device 500 so that magnetic fluxes of the primary coil L1 pass through the secondary coil L2 as shown in FIGS. 1A and 1B. When the transmission of electric power is not required, the charging device 500 and the mobile phone 510 are physically separated from each other so that the magnetic fluxes of the primary coil L1 do not pass through the secondary coil L2.

The power transmission control device 20 is adapted to perform various controls of the power transmission device 10 and can be constituted by an integrated circuit device (IC). The power transmission control device 20 preferably includes a controller 22, a storage section 23, and a load condition detection circuit 30. Note that, it is possible to omit a part of the components and add another component, and thus modifications can be made.

The controller 22 (at the power transmitting side) is adapted to control the power transmission device 10 and the power transmission control device 20. The controller 22 can be constituted by an ASIC circuit such as, for example, a gate array or realized by a microcomputer and a program operating on the microcomputer. The controller 22 controls transmission of electric power by using the power transmission section 12, or controls the storage section 23 or the load condition detection circuit 30. To be specific, the controller 22 performs various sequence controls or determination processes necessary for transmission of electric power, detection of a load condition (detection of data, detection of a foreign object, detection of removal, etc.) or frequency modulation.

The storage section 23 (a register section) is adapted to store various information and can be constituted by, for example, a RAM, a D flip-flop, or a non-volatile memory such as a flash memory or a mask ROM.

The load condition detection circuit 30 (a waveform detection circuit) detects a load condition at the power receiving side (the power reception device or a foreign object). The detection of the load condition can be realized by detecting a change of a waveform of an induction voltage signal (a coil terminal signal) of the primary coil L1. For example, when a load condition (a load current) at the power receiving side (at the secondary side) changes, the waveform of the induction voltage signal changes. The load condition detection circuit 30 detects such a change in the waveform as described above and outputs a detected result (information about a detection result) to the controller 22. The controller 22 determines the load condition (a load fluctuation, a level of the load) at the power receiving side on the basis of the detection information about the load condition at the load condition detection circuit 30.

The power reception device 40 (a power reception module, a secondary module) can includes the secondary coil L2, a power reception section 42, a power supply control section 48 and the power reception control device 50. The structure of each of the power reception device 40 and the power reception control device 50 is not limited to the structure shown in FIG. 2. A part (e.g., the secondary coil) of the components of the devices can be omitted, an additional component (e.g., a load modulation section) can be provided, or connection relationship can be changed, and thus, various modifications can be made.

The power reception section 42 is adapted to convert an AC induction voltage of the secondary coil L2 to a direct current (DC) voltage. The conversion can be performed by a rectification circuit provided to the power reception section 42.

The power supply control section 48 is adapted to control supply of electric power to the load 90. Namely, the power supply control section 48 controls turn-on or turn-off of supplying of electric power to the load 90. To be specific, the power supply control section 48 controls a level of the DC voltage from the power reception section 42 (the rectification circuit) so as to generate a power source voltage, and charges a battery 94 of the load 90 by supplying the source voltage to the load 90. Note that the load 90 can be one not including the battery 94.

The power reception control device 50 is adapted to perform various controls of the power reception device 40 and is constituted by an integrated circuit device (IC). The power reception control device 50 can operate by a power source voltage generated from the induction voltage of the secondary coil L2. The power reception control device 50 preferably includes a control section 52 and a storage section 53.

The controller 52 (at the power receiving side) is adapted to control the power reception device 40 and the power reception control device 50. The controller 52 can be constituted by an ASIC circuit such as, for example, a gate array or realized by a microcomputer and a program operating on the microcomputer. The controller 52 controls the power supply section 48 or the storage section 53. To be specific, the controller 52 performs various sequence controls or determination processes necessary for detection of a position, detection of a frequency, load modulation, or detection of full charge.

The storage section 53 (a register section) stores various information and can be constituted by, for example, a RAM, a D flip-flop, or a non-volatile memory such as a flash memory or a mask ROM.

In the embodiment, the storage section 23 at the transmission side stores information about the transmission side coil. The storage section 53 at the power receiving side stores information about the reception side coil. The controller 52 at the power receiving side transmits the information about the reception side coil stored in the storage section 53 to the power transmission device 10 by using, for example, the contactless electric power transmission technique. To be specific, the controller 52 determines whether or not a positional relationship between the primary coil L1 and the secondary coil L2 is adequate and transmits the information about the power receiving side coil to the power transmission device 10 in a case where it is determined that the positional relationship is adequate (a positional level is adequate).

The controller 22 at the power transmitting side performs a collation process for collating the information about the power transmitting side coil stored in the storage section 23 with the information about the power receiving side coil received from the power reception device 40. After that, determination of whether or not the information about the power transmitting side coil is compatible with (e.g., matched) the information about the power receiving side coil, is made.

To be specific, the storage section 23 at the power transmitting side stores identification information about the primary coil L1 provided to the power transmission device 10 as the information about the power transmitting side coil. On the other hand, the storage section 53 at the power receiving side transmits, to the power transmission device 10, the identification information (a coil code) of the primary coil L1 to which the power reception device 40 is adaptable. Namely, the storage section 23 stores the identification information about the primary coil L1 that is correlated to the secondary coil L2 beforehand as a coil capable of ensuring adequate transmission of electric power by the electromagnetic coupling to the secondary coil L2. The controller 52 at the power receiving side transmits, to the power transmission device 10, the identification information about the primary coil L1 to which the power reception device 40 is adaptable.

For example, it is assumed that first to N-th (N is an integer) types secondary coils can be adaptable to a first type of primary coil L1. Under the above assumption, in a case where a secondary coil L2 of the power reception device 40 is any one of the first to N-th types of secondary coil L2, the controller 52 may transmit identification information about the first type of primary coil L1 as the information about the power receiving side coil. Note that the information about the power receiving side coil can be changed to the identification information about the secondary coil L2 at the power receiving side.

After the power reception device 40 transmits the information about the power receiving side coil, the controller 22 at the power transmitting side determines whether or not the information about the power transmitting side coil (an ID of the primary coil) stored in the storage section 23 is matched to the information about the power receiving side coil (an ID of the primary coil stored at the power receiving side) received from the power reception device 40. In a case where the information is matched each other, it is determined that the information about the power transmitting side coil is compatible with the information about the power receiving side coil.

In a case where it is determined that the information about the power transmitting side coil is compatible with the information about the power receiving side coil, the controller 22 transmits the information about the power transmitting side coil stored in the storage section 23 to the power reception device 40. To be specific, for example, the controller 22 performs detection of a foreign object (primary detection of a foreign object) before transmitting the information about the power transmitting side coil to the power reception device 40. In a case where the controller 22 does not detect a foreign object, it transmits the information about the power transmitting side coil to the power reception device 40.

Note that the storage section 23 preferably stores a plurality of pieces of information about the power transmitting side coils (a plurality of IDs of primary coils). In the above case, the controller 22 transmits the information about the coil matched to the information about the power receiving side coil in the plurality of pieces of information about the power transmitting side coils to the power reception device 40. In a case where, for example, the information about the power receiving side coil received from the power reception device 40 is not compatible with (not matched to) K-th information about the power transmitting side coil in the first to M-th information about the power transmitting side coils, the controller 22 retrieves information about the coil matched to the information about the power receiving side coil in the first to M-th information about the power transmitting side coils and transmits the retrieved information about the coil to the power reception device 40.

When the controller 52 at the power receiving side receives the information about the power transmitting side coil, the controller 52 performs a collation process (determination of matching) for collating between the information about the power transmitting side coil and the information about the power receiving side coil, and determines whether or not the information about the power transmitting side coil is compatible with (matched to) the information about the power receiving side coil.

Note that the controller 52 at the power receiving side transmits the information about the power receiving side coil to the power transmission device 10 before normal transmission of electric power (full-scale transmission of electric power) to the power reception device 40 from the power transmission device 10 is started. The controller 22 at the power transmitting side performs the collation process for collating between the information about the power transmitting side coil and the information about the power receiving side coil before starting the normal transmission of electric power, and starts the normal transmission of the electric power under a condition that the information about the power transmitting side coil is compatible with the information about the power receiving side coil.

3. Transmission/Reception of Information About Coil

When the contactless electric power transmission technique is widely used, it is predicted that various types of secondary coils at the power receiving side may be installed in the business and home markets. Namely, since electric apparatuses such as mobile phones at the power receiving side have various outer shapes and sizes, secondary coils built in power reception devices of electronic apparatuses also may have various shapes and sizes. Since power transmission rates (a watthour) or output voltages in the contactless transmission of electric power required by electronic apparatuses differ from each other, the inductances of the secondary coils differ from each other in accordance therewith.

On the other hand, even when shapes or sizes of the primary coil and the secondary coil are not completely matched each other, the transmission of electric power can be carried out in the contactless power transmission system. In this point, regarding the charging with the use of a cable, it is possible to prevent occurrence of the above problem by devising a connector of the cable. However, it is difficult to do so for the contactless power transmission system.

In this instance, as in JP-A-2006-60909, an example of the related art, it is possible to use a comparing method in which a device ID of a power reception device is transmitted to a power transmission device and the power transmission device performs an authentication process of the device ID.

However, the above comparing method is achieved by assuming a case where a power transmission device and a power reception device are in one-to-one correspondence, but not assuming a case where a plurality of secondary coils are made to correspond to a single primary coil. Therefore, it is difficult to deal with such a situation that various types of secondary coils are spread in the business and home markets. Namely, when a single primary coil is made to correspond to a plurality of secondary coils, a storage section at a power transmitting side needs to store a plurality of device IDs, resulting in complication in managing of the coils.

In the embodiment, as shown in FIG. 2, the storage section 23 at the power transmitting side stores the information about the power transmitting side coil, the storage section 53 at the power receiving side stores the information about the power receiving side coil, and a method of exchanging the information about the coils between the storage sections 23 and 53 is used. In accordance with the above method, even when there are various types of secondary coils, it is possible to deal with the above case without complicating the management of the coils.

Figure 3:
FIG. 3 is an explanatory view showing a method for correlating a plurality of secondary coils to a primary coil.
Figure 3:
Figure 3:
Figure 3:
Figure 3:
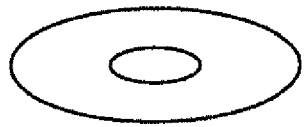
Figure 3:
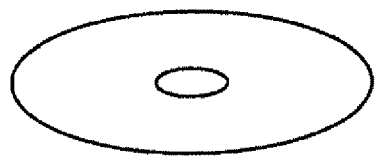
Figure 3:
Figure 3:

To be specific, as shown in FIG. 3, each of secondary coils XA, XB and XC (the first to N-th types of secondary coils in a broad sense) corresponds to a primary coil X (the first type of primary coil in a broad sense) as a proper combination of coils. Namely, the combination of the primary coil X with the secondary coil XA, XB or XC is the proper one so that it is guaranteed that contactless transmission of electric power can be adequately performed on the basis of the above combinations. Likewise, each of secondary coils YA, YB and YC corresponds to a primary coil Y.

In FIG. 3, while each of the secondary coils does not have its own ID, an ID of the primary coil is applied to each of the secondary coils to which the primary coil corresponds. It is assumed that, for example, a coil ID of the primary coil X is CID=IDX. Under the above assumption, a code "IDX" of the ID of the primary coil X is given to the secondary coils XA, XB and XC which are classified into a category of the primary coil X. Likewise, assuming that a coil ID of the primary coil Y is CID=IDY, a code "IDY" of the ID of the primary coil Y is given to the secondary coils YA, YB and YC which are classified into a category of the primary coil Y.

Namely, the power transmission device 10 having the primary coil X stores the code "IDX" of the coil ID of the primary coil X as the information about the power transmitting side coil. In addition, the power reception device 40 having the secondary coil XA stores the code "IDX" of the coil ID of the corresponding primary coil X as the information about the power receiving side coil.

The power reception device 40, for example, transmits the code "IDX" of the coil ID of the primary coil X as the information about the power receiving side coil to the power transmission device 10 before normal transmission of electric power is started. Then, the power transmission device 10 performs determination of matching between the code "IDX" as the information about the power transmitting side coil and the code "IDX" as the information about the power receiving side coil received from the power transmission device 40. When the matching is confirmed, the normal transmission of electric power is started.

It is assumed that, for example, the power reception device 40 having the secondary coil YA transmits the code "IDY" as the information about the power receiving side coil to the power transmission device 10 having the primary coil X. Under the above assumption, since the code "IDX" as the information about the power transmitting side coil is not matched to the code "IDY" as the information about the power receiving side coil, the normal transmission of electric power is not performed. Namely, in a case where the secondary coil of the power reception device 40 is either one of the coils XA, XB and XC (the first to N-th types of coils), the power reception device 40 transmits, to the power transmission device 10, the code "IDX" of the coil ID of the primary coil X (identification information about the first type of the primary coil) as the information about the power receiving side coil.

Thus, as shown in FIG. 3, the coil ID of the primary coil is given to each of the secondary coils which are classified into the category of the primary coil. Therefore, it is enough for the power transmission device 40 to store the ID of only its own primary coil and it is not necessary for the power transmission device 40 to store ID of the secondary coil so that management of the coils can be simplified. In addition, in an unmatched combination such as, for example, a combination of the primary coil X and the secondary coil YA, the coil IDs are not matched each other so that the normal transmission of electric power is not performed. Consequently, it is possible to realize adequate contactless transmission of electric power even when various types of secondary coils are installed in the business and home markets.

The storage section 23 at the power transmitting side may store a plurality of pieces of information about the power transmitting side coil. In FIG. 3, in a case where, for example, the power transmission device 10 is adaptable to both the coil X and the coil Y, the storage section 23 stores the code "IDX" as the information about the primary coil X and the code "IDY" as the information about the secondary coil Y. When, for example, the code "IDX" as the information about the coil XA is transmitted from the power reception device 40, the power transmission device 10 transmits, to the power reception device 40, the code "IDX" as the information which is compatible with the information about the power receiving side coil and is selected from the code "IDX" and the code "IDY" as the plurality of pieces of information about the power transmitting side coil.

On the other hand, when the code "IDY" as the coil information about the coil YA is transmitted from the power reception device 40, the power transmission device 10 transmits, to the power reception device 40, the code "IDY" as the information about the coil which is compatible with the information about the power receiving side coil and is selected from the code "IDX" and the code "IDY". With the above configuration, it is possible to increase variation in matching of coils between the primary side and the secondary side so that it is possible to establish a more flexible system.

Next, operations of the embodiment are described in detail with reference to FIGS. 4A to 4C and FIG. 5A to 5C.

Figure 4A:
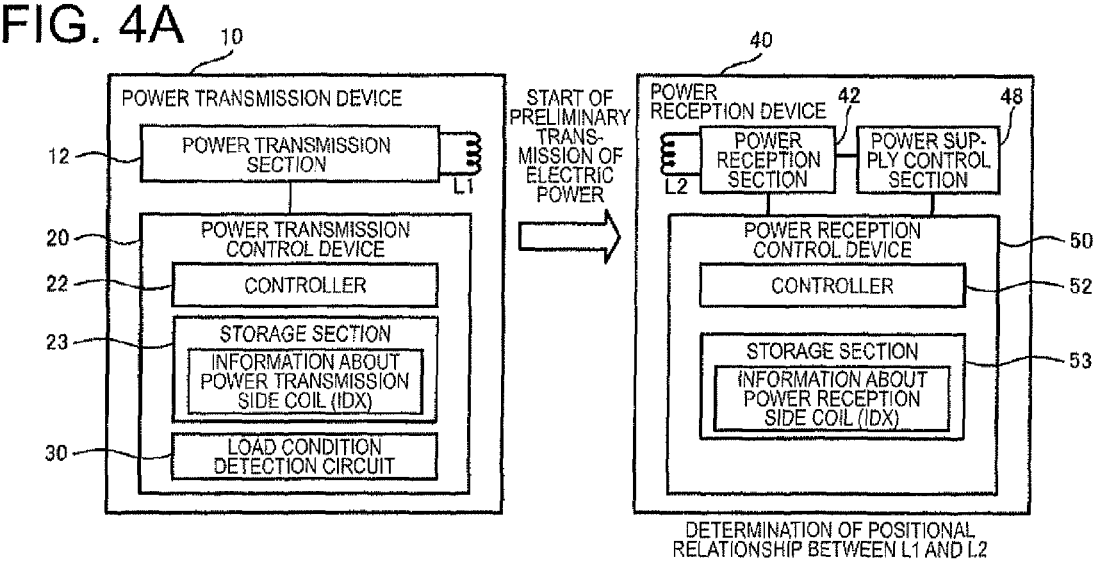
FIGS. 4A, 4B and 4C are explanatory views showing operations according to an embodiment of the invention.

First, as shown in FIG. 4A, the power transmission device 10 starts preliminary transmission of electric power (transmission of electric power for positional detection) before starting normal transmission of electric power. By the preliminary transmission of electric power, a source voltage is supplied to the power reception device 40 so that the power reception device 40 in turned on. The power reception device 40 determines whether or not a positional relationship between, for example, the primary coil L1 and the secondary coil L2 is adequate. To be specific, it determines whether or not the positional relationship between the primary coil L1 and the secondary coil L2 is as shown in FIG. 1B.

Figure 4B:
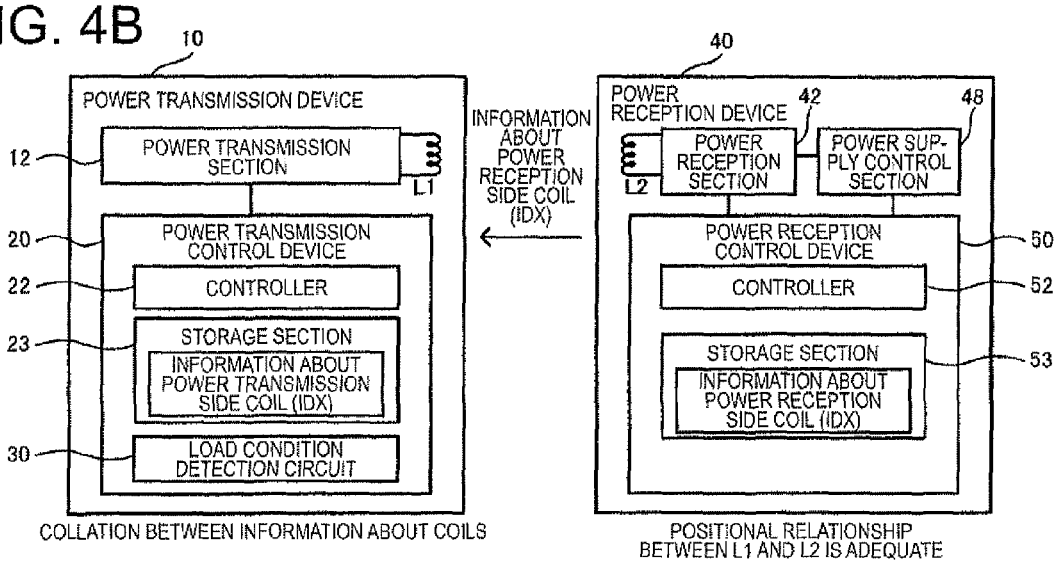

As shown in FIG. 4B, when it is determined that the positional relationship between the coils L1 and L2 is adequate, the power reception device 40 reads the information about the power receiving side coil (the code "IDX") from the storage section 53 and transmits it to the power transmission device 10. Then, the power transmission device 10 performs the collation process for collating the information about the power transmitting side coil (the code "IDX") stored in the storage section 23 with the received information about the power transmitting side coil (the code "IDX").

Figure 4C:
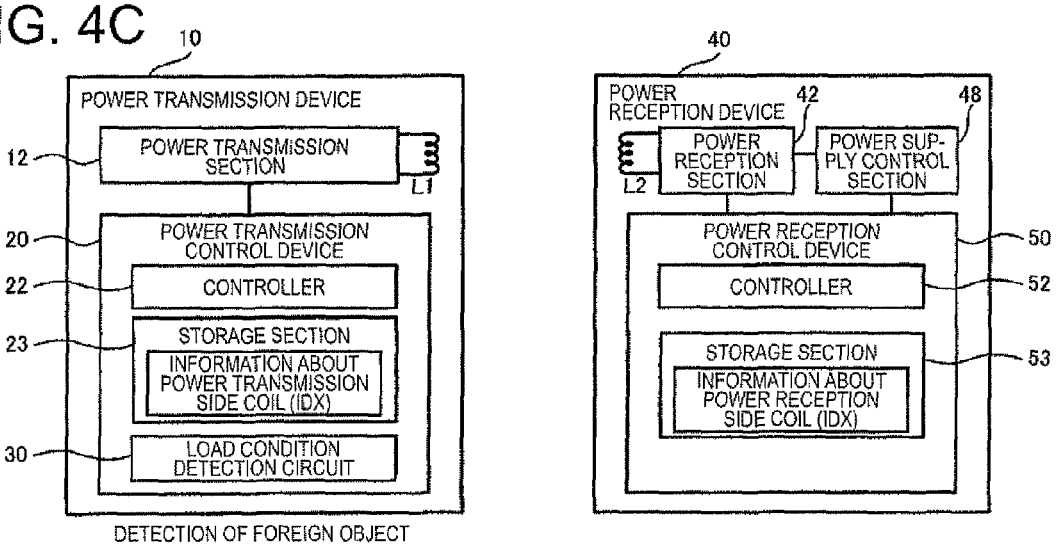
Figure 5A:
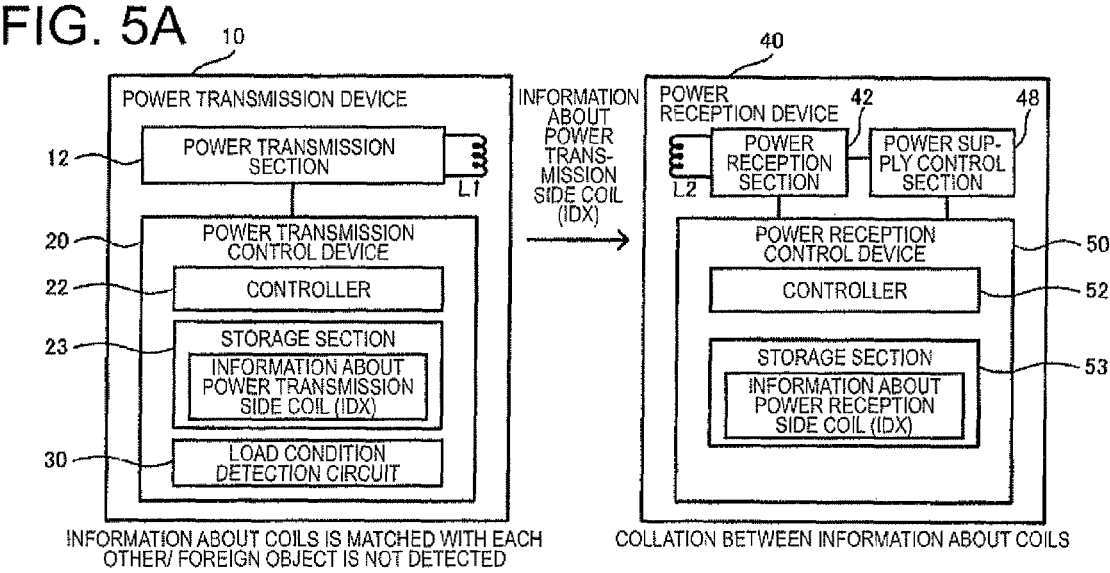
FIGS. 5A, 5B and 5C are explanatory views showing operations according to an embodiment of the invention.
Figure 5B:
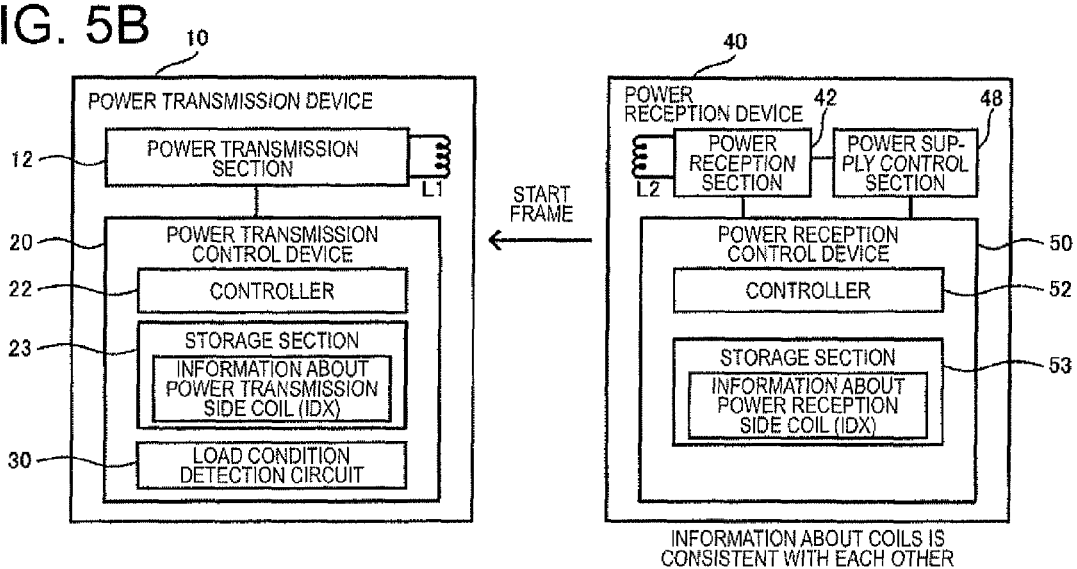

Next, as shown in FIG. 4C, the power transmission device 10 determines whether or not a foreign object is interposed between the primary coil L1 and the secondary coil L2. In a case where it is determined that the information about the power transmitting side coil and the information about the power receiving side coil are compatible with (matched) each other and a foreign object is not detected, the power transmission device 10 transmits the information about the power transmitting side coil (the code "IDX") to the power reception device 40, as shown in FIG. 5A.

Figure 5C:
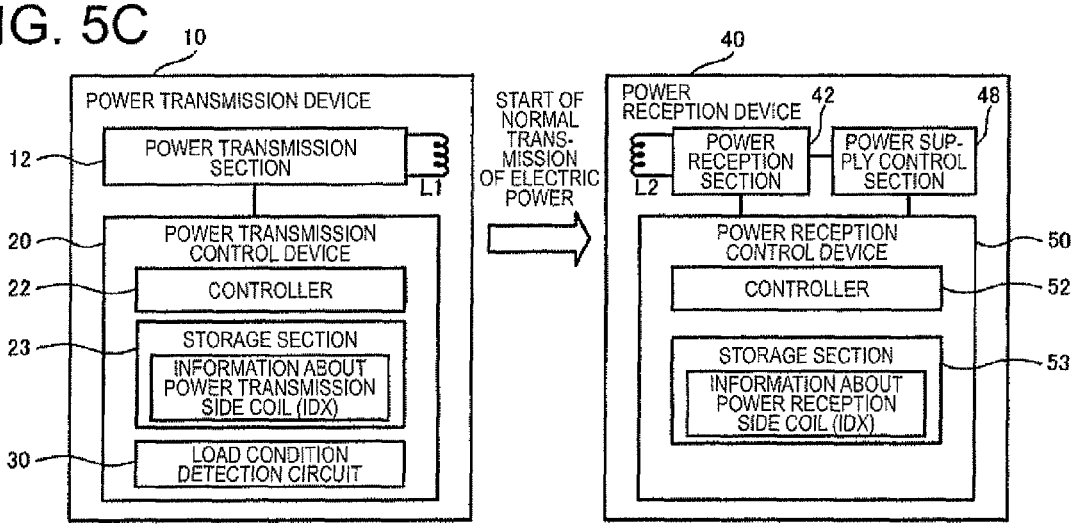

Then, the power reception device 40 performs the collation process for collating the information about the power receiving side coil with the received information about the power transmission coil. In a case where it is determined that the information about the coils is compatible with each other, the power reception device 40 transmits, for example, a start frame to the power transmission device 10, as shown in FIG. 5 reception device 40, and then charging of the battery 94 of the load 90 is started, as shown in FIG. 5C.

As shown in FIGS. 4A to 4C and FIGS. 5A to 5C, in the embodiment, adequate contactless transmission of electric power can be realized such that the information about the coil is exchanged and shared between the power transmission device 10 and the power reception device 40. In addition, various types of secondary coils are installed in the business and home markets, it is possible to deal with such cases according to the embodiment of the invention. As shown in FIG. 4C, the detection of a foreign object is performed in the event of transmission or reception of the information about the coil so that it is possible to realize more adequate contactless transmission of electric power.

4. Process Sequence for Contactless Transmission of Electric Power

Figure 6:
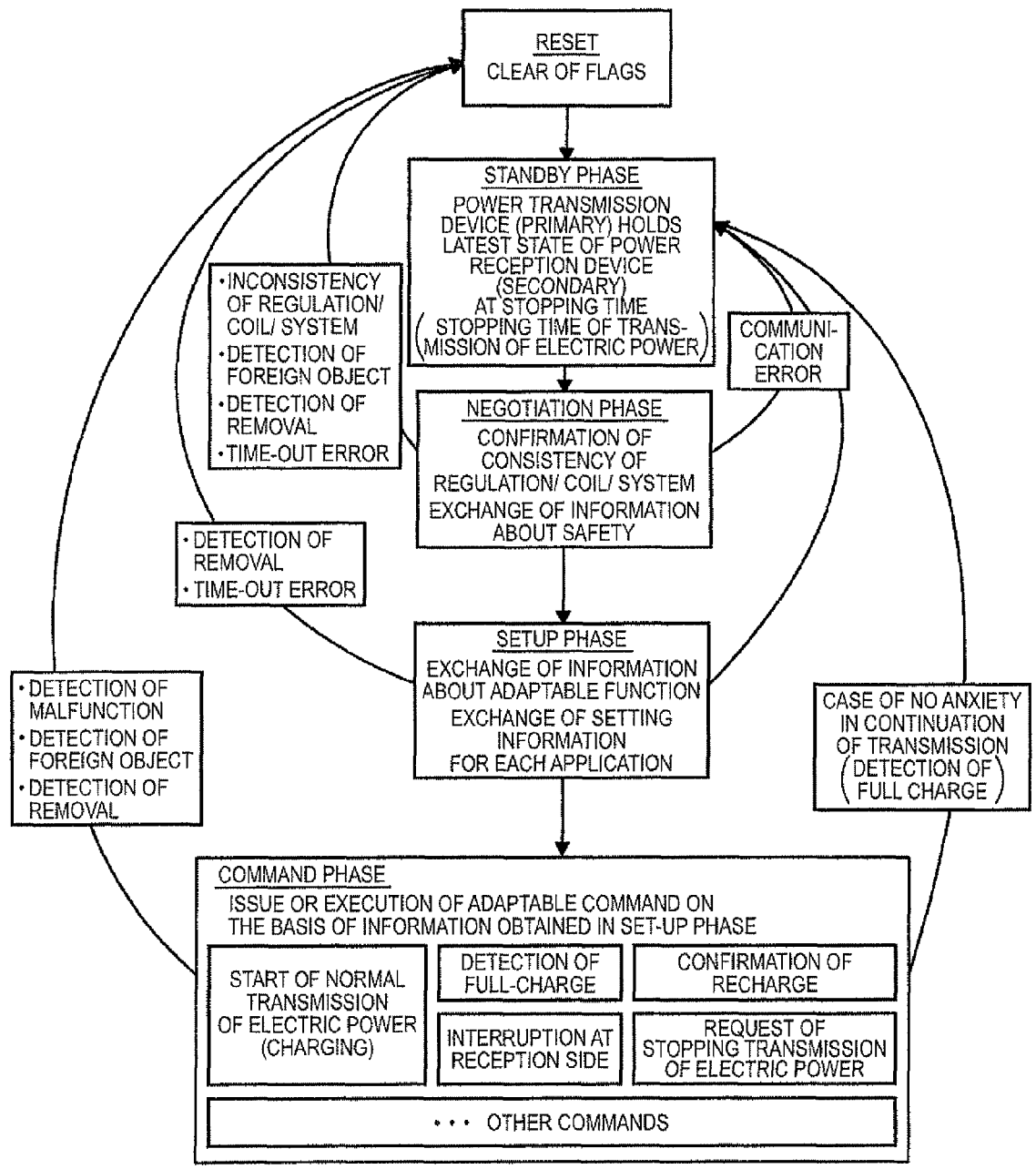
FIG. 6 is a schematic diagram showing a process sequence for the contactless transmission of electric power of an embodiment of the invention.

FIG. 6 is a schematic diagram typically showing a process sequence for contactless transmission of electric power realized by the embodiment.

In this process sequence, after being in a reset state, the contactless power transmission system is moved to be in a standby phase. In the reset state, various flags held by the power transmission device 10 (primary) and the power reception device 40 (secondary) are cleared. Here, the flags are adapted to indicate respective states of the power transmission device 10 and the power reception device 40 (an electric power transmission state, a full charge state, and a recharge confirmation state, etc.) and are held in the storage sections (registers) of the respective devices.

In the standby state, the power transmission device 10 (primary) holds a latest state of the power reception device 40 (secondary) at a stoppage time (electric power transmission stoppage time). For example, when a full charge state of a battery is detected, each of the power transmission device 10 and the power reception device 40 moves to the standby phase after detecting the full charge state. In this instance, since it is necessary to perform recharging by detecting lowering of a voltage of the battery, the power transmission device 10 stores information that the stoppage of the transmission of electric power is caused by the detection of full charge. To be specific, the recharge confirmation flag is not cleared but is maintained to be in a set state, and the necessity of the recharging is checked periodically.

In the standby state, the transmission of electric power to the power reception device 40 from the power transmission device 10 is stopped so that the power reception device 40 is not supplied with the source voltage to be in the stoppage state, but the power transmission device 10 is continuously supplied with the source voltage and is in an operating state. Thus, the power reception device 40 stops its operation in the standby state so that it is possible to save the power consumption. At that time, the power transmission device 10 does not clear the flags of its various states to maintain them so that the power transmission device 10 can perform various operations by using the flags after residing in the standby phase.

After residing in the standby phase, each of the power transmission device 10 and the power reception device 40 moves to a negotiation phase. In the negotiation phase, a negotiation process for confirming a matching of standards, coils or systems, or exchanging information about safety is performed. To be specific, the power transmission device 10 and the power reception device 40 exchange information about the standard, the coil or the system with each other, and mutually confirm the matching thereof. In addition, for example, the power reception device 40 transmits the information about a safety threshold value for detecting a foreign object to the power transmission device 10, thereby exchanging the information about the safety. In the negotiation process, confirmation of whether or not communication of information can be performed between the power transmission device 10 and the power reception device 40, confirmation of whether or not communicated information is adequate, or confirmation of whether a load condition at the power receiving side is adequate (non-detection of a foreign object), is carried out.

In the negotiation process, when it is determined that the standards, coils or systems are not matched each other, a foreign object is detected, removal of an apparatus is detected, or a time-out error occurs, the power transmission device 10 moves to a reset state and the various flags are cleared. On the other hand, when a communication error occurs, the power transmission device 10 moves to the standby phase and clearing of the flags is not performed.

The power transmission device 10 or the power reception device 40 moves to a set-up phase after residing in the negotiation phase. In the set-up phase, a set-up process for transmitting set-up information such as information about an adaptable function or setting information for each application is performed. For example, setting of a transmission condition for the contactless transmission of electric power is performed on the basis of a result of the negotiation process. To be specific, when the power reception device 40 transmits information about the transmission condition such as a driving voltage and a driving frequency of the coil to the power transmission device 10, the power transmission device 10 sets the transmission condition for the normal transmission of electric power such as the driving voltage or the driving frequency on the basis of the received information about the transmission condition. In addition, exchanging of information about the adaptable function and the setting information different for each upper application is also performed in the set-up process. To be specific, exchanging of information about a kind of a command that can be issued or executed by the power transmission device 10 and the power reception device 40 in a command phase or about an additional adaptable function such as a periodic authentication function is performed in the set-up process. Accordingly, it is possible to exchange the setting information that differs depending on an application of a kind (a mobile phones an audio device) or a model type of an electronic apparatus.

In the set-up process, when removal of an apparatus is detected or a time-out error occurs, the power transmission device 10 moves to a reset state. When a communication error occurs, the power transmission device 10 moves to the standby phase.

After residing in the set-up phase, the power transmission device 10 or the power reception device 40 moves to the command phase. In the command phase, a command process is performed on the basis of the information obtained by the set-up process. Namely, the issuing or executing of an adaptable command (a command that is confirmed to be adaptable in the set-up process) is performed. Commands capable of being executed by the command process may include, for example, a normal electric power transmission (charge) start command, a full charge detection (notice) command, a recharge confirmation command, a power receiving side interruption command, and a power transmission stoppage request command.

When, for example, the normal transmission of electric power is prepared in the negotiation process and the set-up process, the power transmission device 10 transmits (issues) the normal electric power transmission (charge) start command to the power reception device 40. After that, the power reception device 40 that receives the start command transmits a response command to the power transmission device 10, and then the power transmission device 10 starts the normal transmission of electric power. When the power reception device 40 detects the full charge state after starting the normal transmission of electric power, the power reception device 40 transmits the full charge detection command to the power transmission device 10.

When continuing of the transmission is not necessary because of the detection of full charge, the power transmission device 10 moves to the standby phase after the detection of full charge. The power transmission device 10 transmits again the recharge confirmation command to the power reception device 40 via the negotiation process and the set-up process. Hereby, the power reception device 40 determines whether or not the recharging is necessary by checking the voltage of the battery. In a case where the recharging is necessary, the recharge confirmation flag is reset and the power transmission device 10 issues the normal electric power transmission start command, thereby restarting the normal transmission of electric power. On the other hand, in a case where the recharging is not necessary, the recharge confirmation flag is maintained in a set state, and then the power transmission device 10 returns to the standby phase after the detection of full charge.

When a malfunction is detected, a foreign object is detected or removal of an apparatus is detected in the command process, the power transmission device 10 moves to the reset state.

Figure 7:
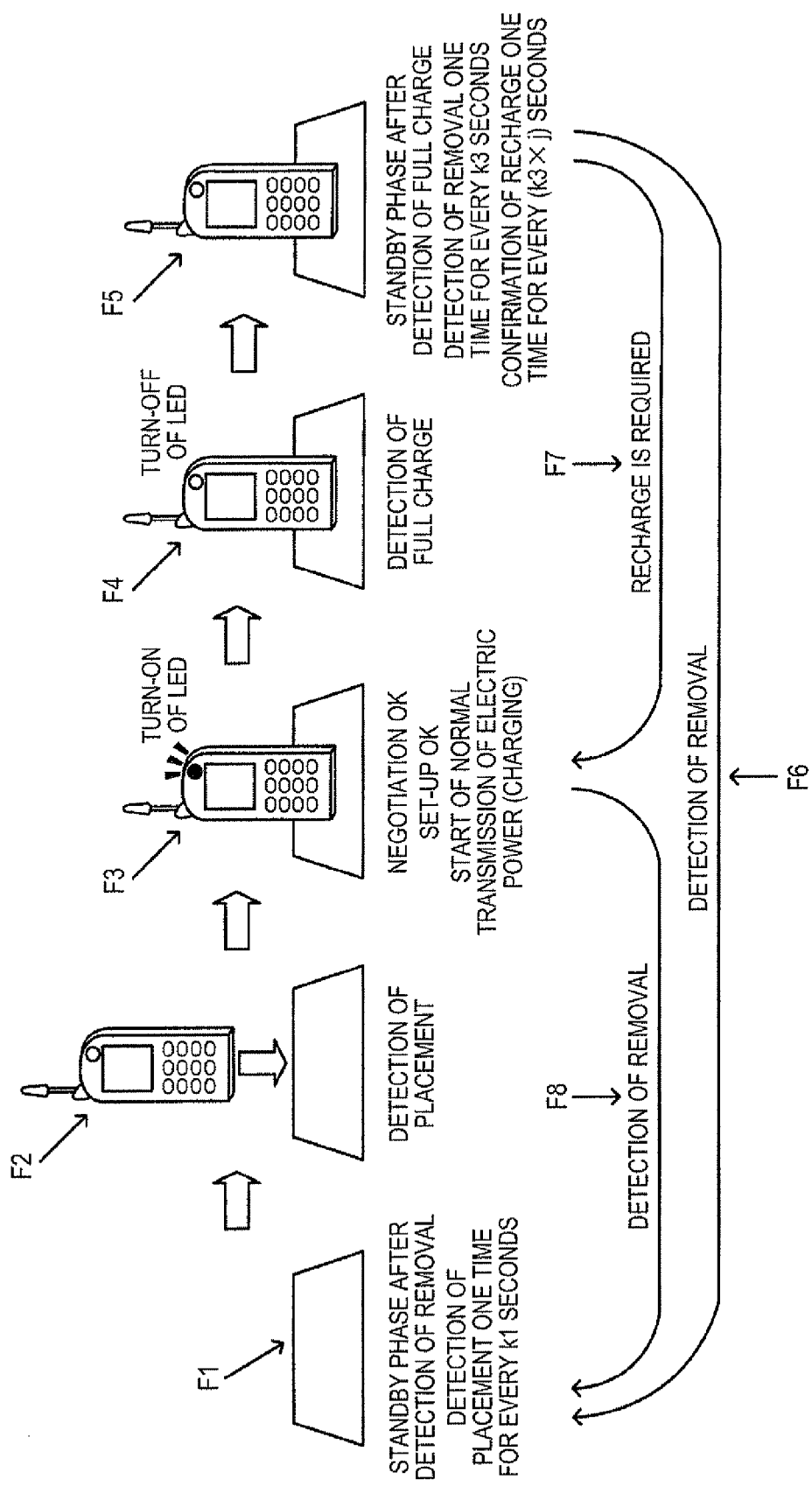
FIG. 7 is a schematic diagram showing a process sequence for the contactless transmission of electric power of an embodiment of the invention.

FIG. 7 is a diagram more specifically showing the process sequence of the embodiment. In the standby phase, shown as F1, after detection of removal, detection of placement is performed, for example, one time for every k1 seconds. When placement of an electronic apparatus is detected as shown as F2, the negotiation process and the set-up process are carried out. When the negotiation process and the set-up process are adequately completed as shown as F3 and the normal power transmission start command is issued in the command process, the normal transmission of electric power is started and the charging of the electronic apparatus is started. When a full charge state is detected as shown as F4, an LED of the electronic apparatus is turned off and the power transmission device 10 moves to the standby phase after the detection of full charge as shown in as F5.

In the standby phase, shown as F5, after the detection of full charge, the detection of removal is performed, for example, one time for every k3 seconds and a process of recharge confirmation is performed one time for every (k3×j) seconds. When the removal of the electronic apparatus is detected as shown in a phase F6 in the standby phase, as shown as F5, after the detection of full charge, the power transmission device 10 moves to the standby phase, as shown as F1, after the detection of removal. On the other hand, it is determined that the recharging is necessary by the recharge confirmation as shown in as F7 in the standby phase, as shown as F6, after the detection of full charge, the negotiation process and the set-up process are carried out, the normal transmission of electric power is restarted and the recharging of the battery is performed. Here, when removal of the electronic apparatus is detected while performing the normal transmission of electric power as shown as F8, the power transmission device 10 moves to the standby phase, as shown as F1, after the detection of removal.

Figure 8A:
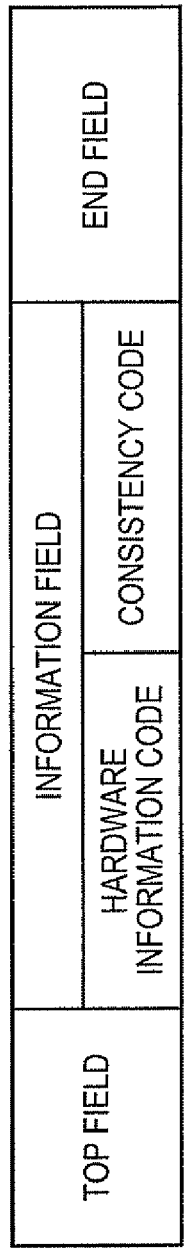
FIGS. 8A, 8B and 8C are explanatory views showing an example of a format of a negotiation frame.

FIG. 8A is a structural view showing an example of a format of a negotiation frame which is to be transmitted during the negotiation process. The negotiation frame has a start field, an information field and an end field. The information field is composed of a matching code and a hardware information code.

Figure 8B:
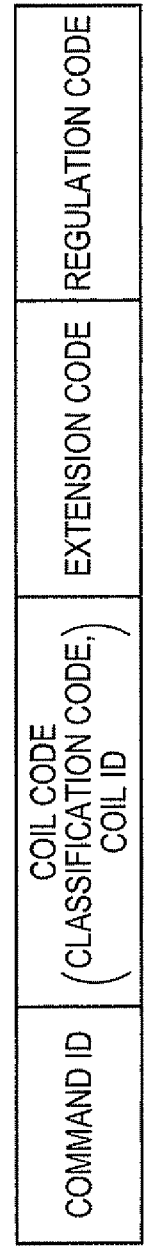

FIG. 8B is a structural view showing an example of a format of the matching code. The matching code is composed of a command ID, a standard code, an extension code and a coil code.

The command ID is an ID indicating the matching code. The standard code is a code indicating a version of the standard. The extension code is a code indicating an ID code system. Management of a code length is performed on the basis of, for example, an extension code management ledger.

The coil code is a code indicating information about a coil and is composed of, for example, a standard code and a coil ID (information about a coil identification). The segment code is used for designating a manager of the coil ID. The coil ID is given to the primary coil (a primary coil unit) by the manager. Namely, the ID of the primary coil at the power transmitting side is given not only to the primary coil at the power transmitting side but also to the secondary coil at the power receiving side. Here, definition of the coil ID is changed on the basis of the extension code. In a case where, for example, the extension code is in a first setting, the coil code is set being divided into the segment code and the coil ID. In a case where the extension code is in a second setting, the coil code is set without being divided into the segment code and the coil code.

Figure 8C:
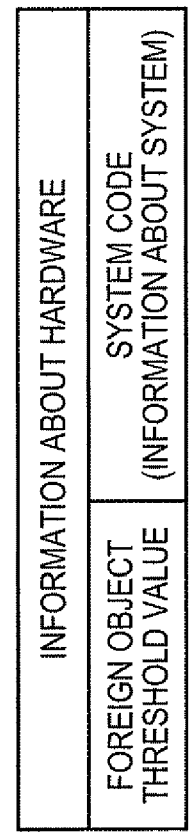

FIG. 8C is a structural view showing an example of a format of the hardware information code. The hardware information code is composed of a system code and a foreign object threshold value. The system code indicates information about a system, which specifically indicates a detection method of a load condition at the power transmitting side or the reception side. As the detection method of the load condition, a pulse width detection method (a phase detection method), a current detection method, a peak voltage detection method and a combination of the above methods can be listed. The system code is a code indicating which method is used by the power transmission device 10 or the power reception device 40.

The foreign object threshold value is information about a threshold value on safety. The foreign object threshold value is stored in, for example, the storage section 52 of the power reception device 40 and is transmitted to the power transmission device 10 from the power reception device 40 before the normal transmission of electric power is started. The power transmission device 10 performs a primary foreign object detection process for detecting a foreign object before starting the normal transmission of electric power on the basis of the foreign object threshold value. In a case where, for example, the load condition at the power receiving side is detected by the pulse width detection method, a threshold value of a count value of a pulse width is transmitted to the power transmission device 10 from the power reception device 40 as the foreign object threshold value. After that, the power transmission device 10 performs the primary foreign object detection by the pulse width detection method on the basis of the threshold value of the count value.

In accordance with the above process sequence of the embodiment, for example, judging of the matching property of standards, coils or systems, or exchanging of a minimum amount of information on safety are performed in the negotiation process. In the negotiation process, capability of communication or adequacy of information about communication is determined, and also adequacy of the load condition at the power receiving side is determined.

In the set-up process, setting of the transmission condition necessary for the normal transmission of electric power is performed. For example, the driving voltage or the driving frequency of the coil is set. In addition, exchanging of information about an additional adaptable function and the setting information necessary for each upper application is performed.

The power transmission device 10 moves to the command phase via the above set-up process and the negotiation process, and performs the command process. The issuing or executing of the command which is confirmed to be adaptable in the negotiation process is carried out in the command process.

In accordance with the above process sequence, exchanging of a minimum amount of information necessary for the matching property of the systems or securing of the safety is performed in the negotiation process and exchanging of set-up information different for each application is performed in the set-up process. Therefore, in a case where the power transmission device 10 and the power reception device 40 are not adaptable to each other, that combination is excluded in the negotiation process so that it is possible to omit the transmission of the set-up information having a large amount. Accordingly, since it is possible to transmit only necessary minimum information in the negotiation process so that the amount of information to be transmitted is reduced, the negotiation phase can be completed in a short time and the processing can be made efficient.

The devices at the power transmitting side and the power receiving side can perform the contactless transmission of electric power at a minimum level in the negotiation process, and the functional extension for each of the devices can be realized by exchange of the set-up information. Therefore, each of the devices can perform minimum setting necessary for the contactless transmission of electric power system in the negotiation process so that the system can be optimized, thereby establishing the flexible system.

In addition, the power transmission device 10 receives the information about the threshold value or the system from the power reception device 40 and sets the received information as its configuration. Only by the above setting, the power transmission device 10 can realize the contactless transmission of electric power or the detection of a foreign object so that it is possible to simplify the processes at the power transmitting side. In this instance, the power reception device 40 transmits the information about the coil and the information about the threshold value in the adequate combination of the primary coil and the secondary coil to the power transmission device 10 so that it is possible to realize the adequate, safety contactless transmission of electric power.

Namely the adequate threshold value varies depending on the combination of the primary coil and the secondary coil. In this point, by a method in where the information about the coil and the corresponding threshold value information is stored in the storage section 53 at the power receiving side and the power reception device 40 transmits the information to the power transmission device 10, the detection of a foreign object can be performed by using the adequate threshold value corresponding to the combination of the coils, thereby improving the safety in the contactless transmission of electric power.

5. Recording of Information About Coil to Coil Unit

Figure 9:
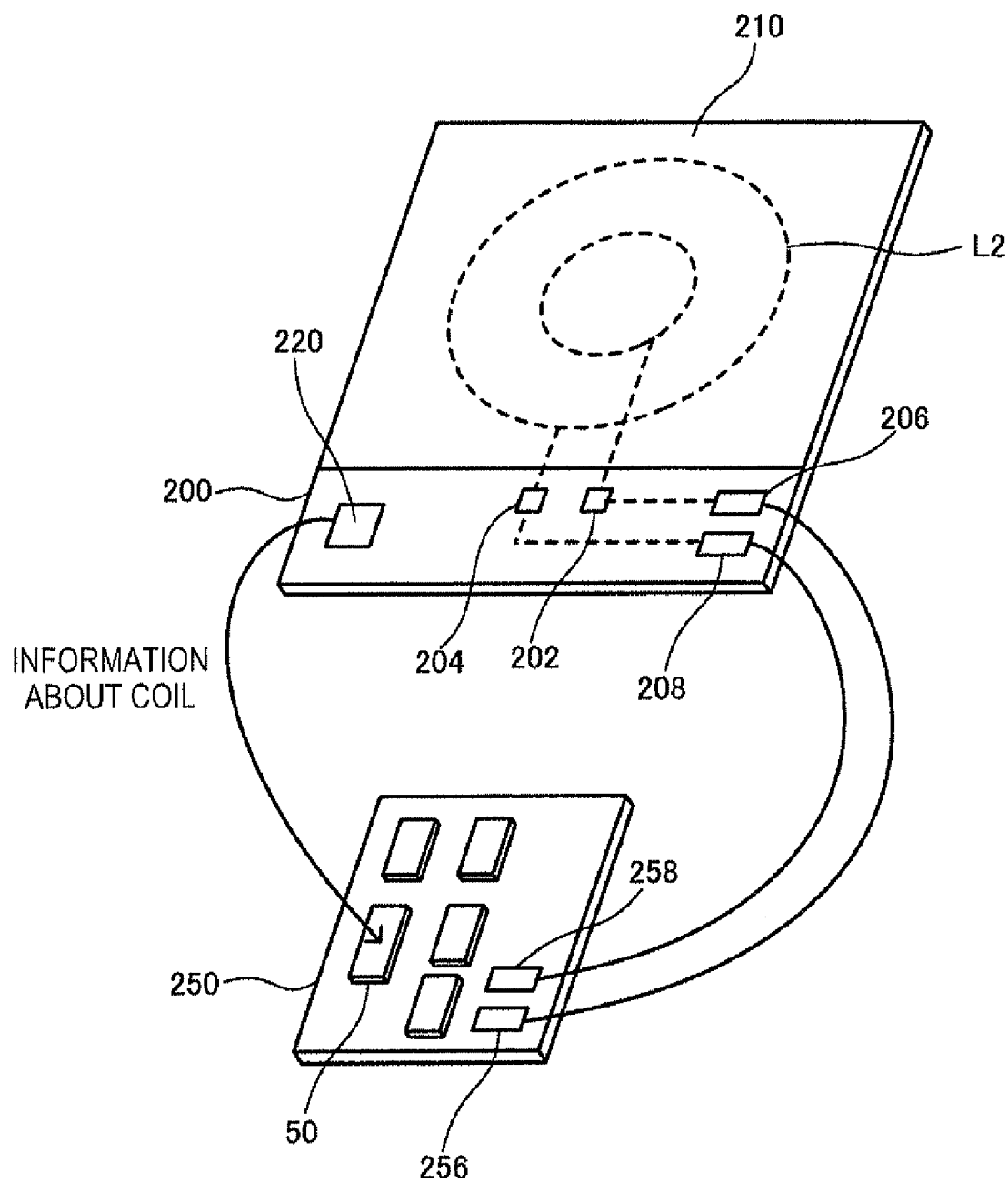
FIG. 9 is a schematic view exemplarily showing a specific structure of a power reception device according to an embodiment of the invention.

FIG. 9 is a schematic view showing a specific example of the structure of the power reception device 40. The power reception device 40 shown in FIG. 9 includes a coil unit 200 having the secondary coil L2 mounted thereon, and a control unit 250 having the power reception control device 50 mounted thereon. The coil unit 200 is provided with a coil information recording section 220 in which the information about the power receiving side coil is recorded. The controller 52 of the power reception control device 50 is adapted to transmit the information about the power receiving side coil recorded in the coil information recording section 220 to the power transmission device 10.

To be specific, in the coil unit 200, a hole is formed on a substrate of the coil unit 200 and the secondary coil L2 formed by spirally winding a coil wire is provided to the hole. For example, a cover 210 made of a magnetic material for shielding is provided above the secondary coil L2.

One end of the secondary coil L2 is connected to a coil connection terminal 202, and the coil connection terminal 202 is connected to an external terminal 206. The other end of the secondary coil L2 is connected to a coil connection terminal 204, and the coil connection terminal 204 is connected to an external terminal 208.

The control unit 250 is constituted by a circuit board, and various ICs of the power reception control device 50 and a power transmission driver forming the power transmission section 12 are mounted on the circuit board. External connection terminals 256 and 258 of the control unit 250 are formed on the circuit board. The external connection terminals 256 and 258 on the control unit 250 are respectively connected to the external connection terminals 206 and 208 of the coil unit 200 through cables.

The coil information recording section 220 is constituted by, for example, a barcode. The information about a coil at the power transmitting side is recorded in the coil information recording section 220. In the case of FIG. 3, the identification information about the primary coil to which the secondary coil L2 is adaptable is recorded in the coil information recording section 220. The coil information recording section 220 is attached to the coil unit 200 when, for example, assembling the coil unit 200. The coil information recording section 220 is not limited to the barcode but can be modified in various ways including, for example, an RF tag.

In the assembling process of the coil unit 200 and the control unit 250, the information about a coil is read from the coil information recording section 220. The read information about the coil is stored in the storage section 53 of the power reception control device 50. To be specific, the information about the coil read from the coil information recording section 220 stored in, for example, an EEPROM provided to the inside or outside of the power reception control device 50. The information about the coil stored in the EEPROM is transferred to the storage section 53 of the power reception control device 50 to be stored therein. It is possible to use a fuse circuit instead of the EEPROM.

By dividing the power reception device 40 into the coil unit 200 and the control unit 250 as shown in FIG. 9, it is possible to enhance a degree of freedom of installing the coil unit 200 to an electronic apparatus. In a case where, for example, the coil unit 200 is installed in the electronic apparatus, it is preferable to place the coil unit 200 to a portion where the contactless transmission of electric power can be maintained in high efficiency. On the other hand, the coil unit 200 requires some area. In this instance, by separately providing the coil unit 200 as an independent component as shown in FIG. 9, it is possible to efficiently install the coil unit 200 to the electronic apparatus while maintaining the contactless transmission of electric power in high efficiency.

However, in a case where the coil unit 200 is separated as the independent component as shown in FIG. 9, a problem may arise that correlating of the information about the coil is erroneously carried out in an assembling process of connecting the coil unit 200 to the control unit 250.

It is assumed that, for example, the secondary coil L2 is correlated to the primary coil X in FIG. 3. Under the above assumption, the code "IDX" as the ID of the primary coil X has to be stored in the power reception control device 50. However, if the code "IDY" as the ID of the primary coil Y is stored in the process of assembling, a problem arises that adequate contactless transmission of electric power is not able to be performed.

In FIG. 9, in a case where the secondary coil 12 is correlated to the primary coil X, the code "IDX" as the ID of the primary coil X is recorded in the coil information recording section 220 during the assembling of the coil unit 200. The code "IDX" of the information about the coil is read from the coil information recording section 220 to be stored in the storage section 53 of the power reception control device 50. Therefore, it is possible to effectively prevent a problem that the code "IDY" as the ID of the primary coil is stored. As a result, since the coil unit 200 and the control unit 250 are separately formed as the independent components, the components can be efficiently installed in an electronic apparatus by maintaining the contactless transmission of electric power in high efficiency, and it is possible effectively prevent a problem that wrong information about the coil is stored in the storage section 53.

6. Example of Detail Structure

Figure 10:
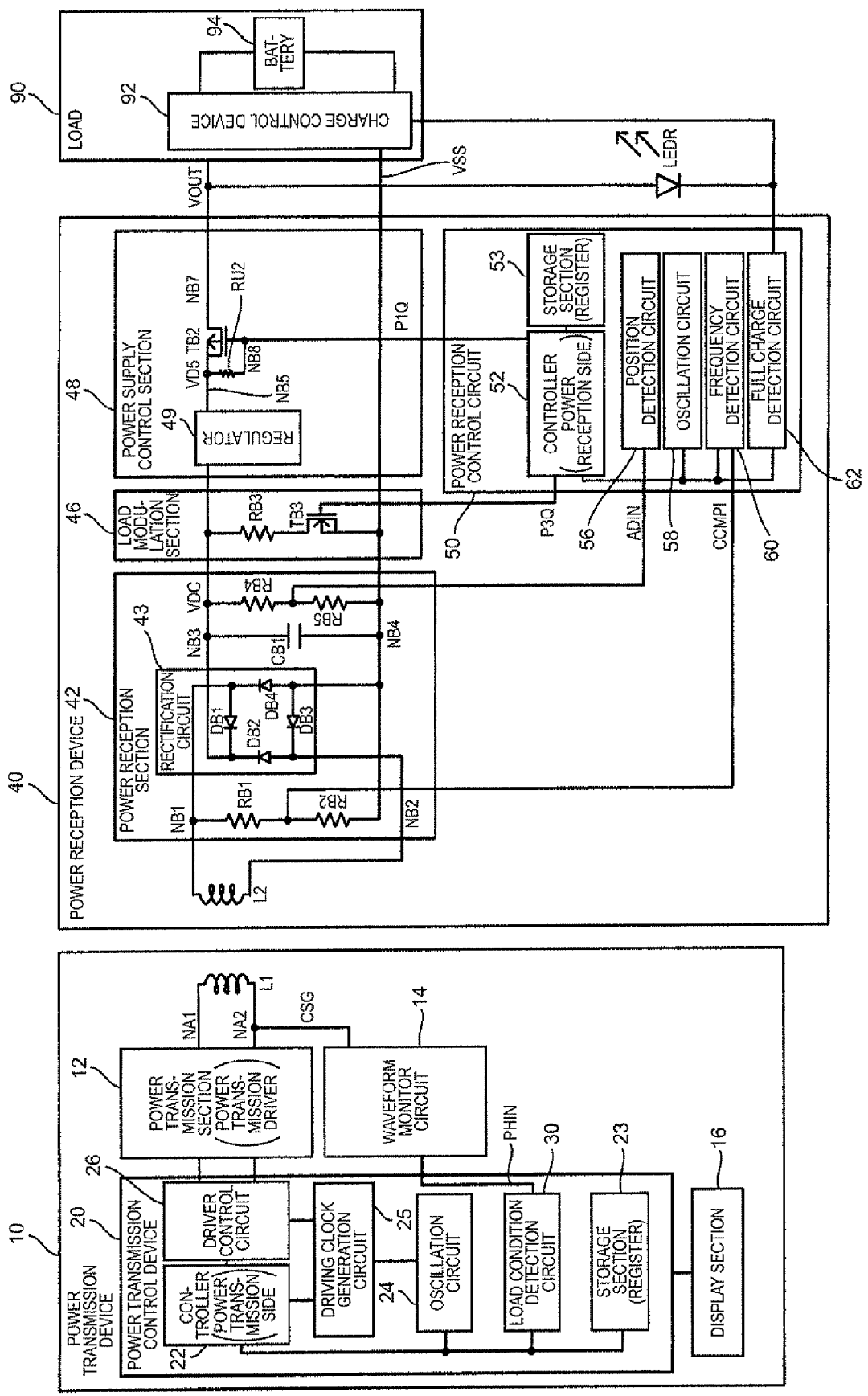
FIG. 10 is a schematic view showing detailed structures of a power transmission device, a power transmission control device, a power reception device, and a power reception control device according to an embodiment of the invention.

FIG. 10 is a schematic view showing an example of a detail structure of the embodiment. The elements as those described in FIG. 2 have the same reference numerals and the explanations are omitted.

A waveform monitor circuit 14 (a rectification circuit) generates an induction voltage signal PHIN for waveform monitoring on the basis of a coil end signal CSG of the primary coil L1. For example, the coil end signal CSG as the induction voltage signal of the primary coil L1 may exceed a maximum normal-rated voltage of an IC of the power transmission control device 20 or may become a negative voltage. By receiving the coil end signal CSG, the waveform monitor circuit 14 generates the induction voltage signal PHIN for waveform monitoring as a signal whose waveform can be detected by the load condition detection circuit 30 of the power transmission control device 20, and outputs the induction voltage signal PHIN to, for example, a waveform monitoring terminal of the power transmission control device 20. A display section 16 displays various states (a state of transmission of electric power, a state of authentication of an ID) of the contactless power transmission system by using a color or an image.

An oscillation circuit 24 generates a clock at the primary side. A driving clock generation circuit 25 generates a driving clock for regulating the driving frequency. A driver control circuit 26 generates a control signal having a desired frequency in accordance with a driving clock output from the driving clock generation circuit 25 and a frequency setting signal output from the controller 22, and outputs the control signal to the first and second power transmission drivers of the power transmission section 12 to control the first and second power transmission drivers.

The load condition detection circuit 30 rectifies the waveform of the induction voltage signal PHIN to generate a waveform rectification signal. In a case where, for example, the signal PAIN exceeds a given threshold voltage, the load condition detection circuit 30 generates the waveform rectification signal (a pulse signal) having a square waveform (a rectangular waveform) that is in an active state (e.g., an H level). The load condition detection circuit 30 detects information about a pulse width (a pulse width term) of the waveform rectification signal on the basis of the waveform rectification signal and the driving clock. To be specific, the load condition detection circuit 30 detects the pulse width information about the waveform rectification signal while receiving the waveform rectification signal and the driving clock output from the driving clock generation circuit 25 so that it detects information about the pulse width of the induction voltage signal PHIN.

Note that the method of the load condition detection circuit 30 is not limited to the pulse width detecting method (the phase detecting method), and various methods such as a current detecting method or a peak voltage detecting method can be applied to the load condition detection circuit 30.

The controller 22 (the power transmission control device) determines the load condition (fluctuation in a load, a level of a load) at the power receiving side (the secondary side) on the basis of the detection result by the load condition detection circuit 30. For example, the controller 22 determines the load condition at the power receiving side on the basis of the information about the pulse width detected by the load condition detection circuit 30 (a pulse width detection circuit) and performs, for example, detection of data (a load), detection of a foreign object (a metal object), and detection of removal (detachment). Namely, the pulse width term as information about the pulse width of the induction voltage signal varies in accordance with the change of the load condition at the power receiving side. The controller 22 can detect the fluctuation in the load at the power receiving side on the basis of the pulse width term (a count value obtained by measuring the pulse width term).

The power reception section 42 is adapted to convert the AC induction voltage of the secondary coil L2 to a direct current (DC) voltage. The conversion is performed by a rectification circuit 43 provided to the power reception section 42.

A load modulation section 46 is adapted to perform a load modulation process. To be specific, in a case where the power reception device 40 transmits desired data to the power transmission device 10, the load modulation section 46 (at the secondary side) changes the load in accordance with transmission data so as to change a signal waveform of the induction voltage of the primary coil L1. For this reason, the load modulation section 46 includes a resistor RB3 and a transistor TB3 (an N type CMOS transistor) serially arranged between nodes NB3 and NB4. The transistor TB3 is on/off controlled in accordance with a signal P3Q output from the controller 52 of the power reception control device 50. In a case where the load modulation is performed by on/off controlling the transistor TB3, a transistor TB2 of the power supply control section 48 is turned off so as to allow the load 90 to be electrically disconnected from the power reception device 40.

The power supply control section 48 is adapted to control supplying of electric power to the load 90. A regulator 49 is adapted to generate a source voltage VD5 (e.g., 5 V) by controlling a voltage level of the DC voltage VDC obtained by conversion by the rectification circuit 43. The power reception control device 50 is operable by being supplied with, for example, the source voltage VD5.

The transistor TB2 (a P type CMOS transistor, a power supply transistor) is controlled in accordance with a signal P1Q output from the controller 52 of the power reception control device 50. To be specific, the transistor TB2 is in an off-state during the negotiation process or the set-up process, but in an on-state during the normal transmission of electric power.

A position detection circuit 56 is adapted to determine adequacy of the positional relationship between the primary coil L1 and the secondary coil L2. An oscillation circuit 58 is adapted to generate a clock at the secondary side. A frequency detection circuit 60 is adapted to detect a frequency (f1, f2) of a signal CCMPI. A full charge detection circuit 62 is adapted to detect whether or not the battery 94 (the secondary battery) of the load 90 is in a full charge state (a charge state).

The load 90 can include a charge control device 92 for controlling charge of the battery 94. The charge control device 92 (a charge control IC) is constituted by an integrated circuit device. Note that the battery 94 may be provided with a function of the charge control device 92 such as a smart battery.

In FIG. 10, data communication from the power transmission device 10 to the power reception device 40 is achieved by the frequency modulation and data communication from the power reception device 40 to the power transmission device 10 is achieved by the load modulation.

Figure 11A:
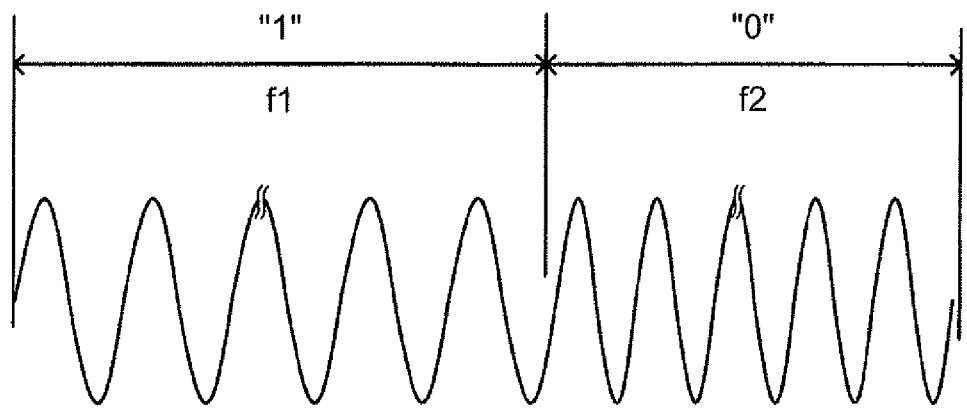
FIG. 11A is a graph for explaining transmission of data by frequency modulation according to an embodiment of the invention.
Figure 11B:
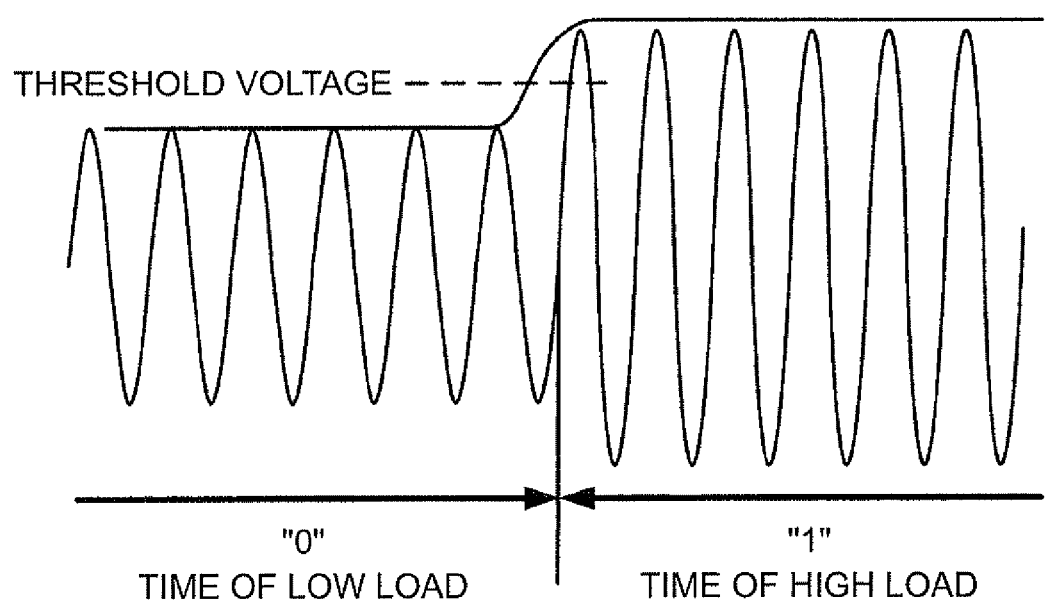
FIG. 11B is a graph for explaining transmission of data by load modulation according to an embodiment of the invention.

FIG. 11A is a graph for explaining the frequency modulation, and FIG. 11B is a graph for explaining the load modulation. To be specific, as shown in FIG. 11A, the power transmission section 12 generates the AC voltage having the frequency f1 when transmitting, for example, data "1" to the power reception device 40, and generates the AC voltage having the frequency f2 when transmitting data "0" to the power reception device 40. The frequency detection circuit 60 at the power receiving side detects the change of the frequency so as to discriminate between data "1" and data "0". With this configuration, the data communication by the frequency modulation from the power transmission device 10 to the power reception device 40 can be established.

On the other hand, the load modulation section 46 at the power receiving side changes the load at the power receiving side in accordance with the data to be transmitted so as to change the signal waveform of the induction voltage of the primary coil L1 as shown in FIG. 11B. When, for example, data "1" is transmitted to the power transmission device 10, the power reception device 40 is set in a high load condition. When data "0" is transmitted to the power transmission device 10, the power reception device 40 is set in a low load condition. The load condition detection circuit 30 at the power transmitting side detects the change of the load condition at the power receiving side so as to discriminate between data "1" and data "0". With this configuration, the data communication by the load modulation from the power reception device 40 to the power transmission device 10 can be established.

Note that while the data communication from the power transmitting side to the power receiving side is established by the frequency modulation and the data communication from the power receiving side to the power transmitting side is established by the load modulation as shown in FIGS. 11A and 11B, a modulation technique or a communication technique other than the above can be used.

7. Operations

Figure 12:
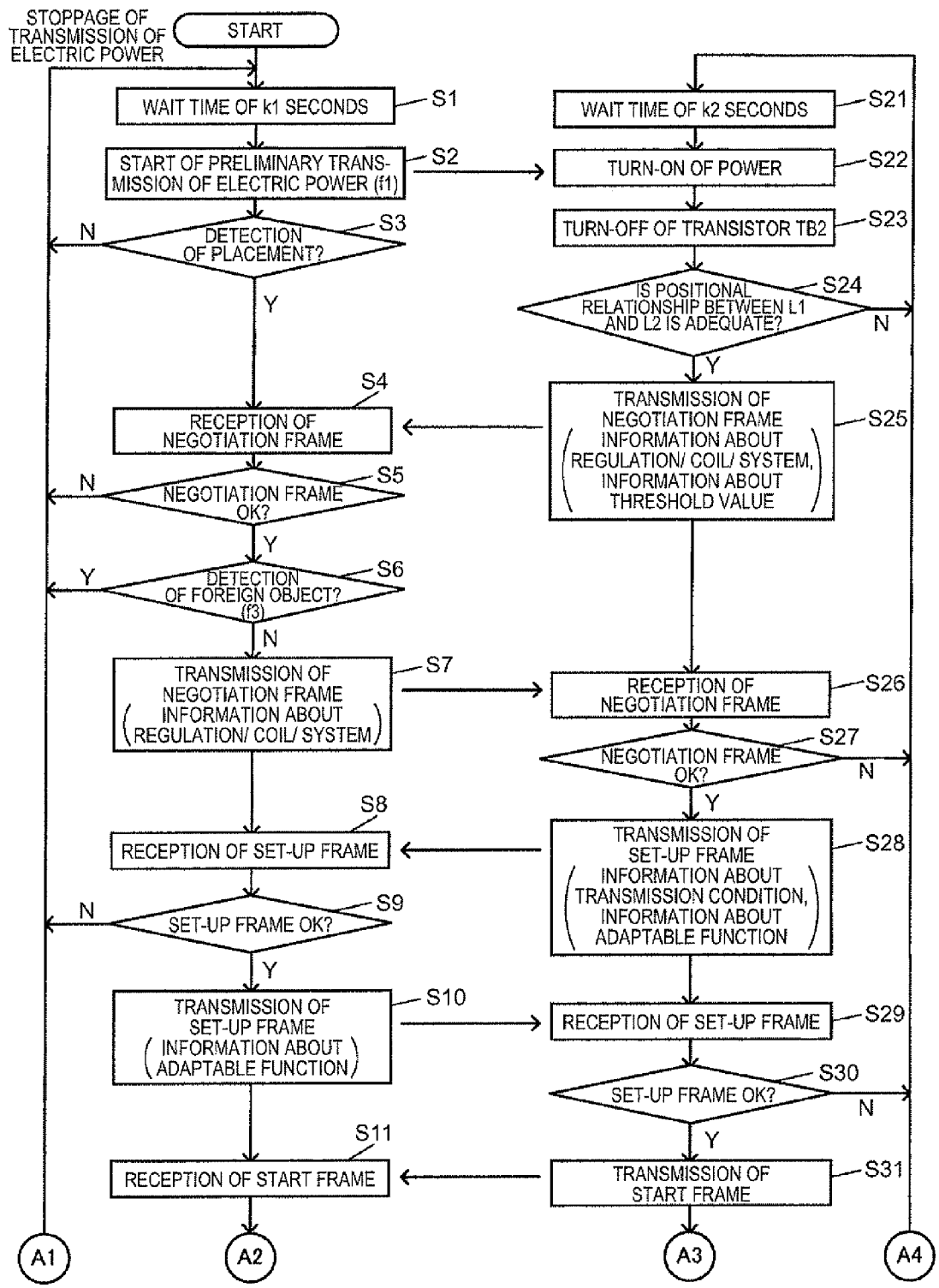
FIG. 12 is a flowchart for explaining an operation according to an embodiment of the invention.
Figure 13:
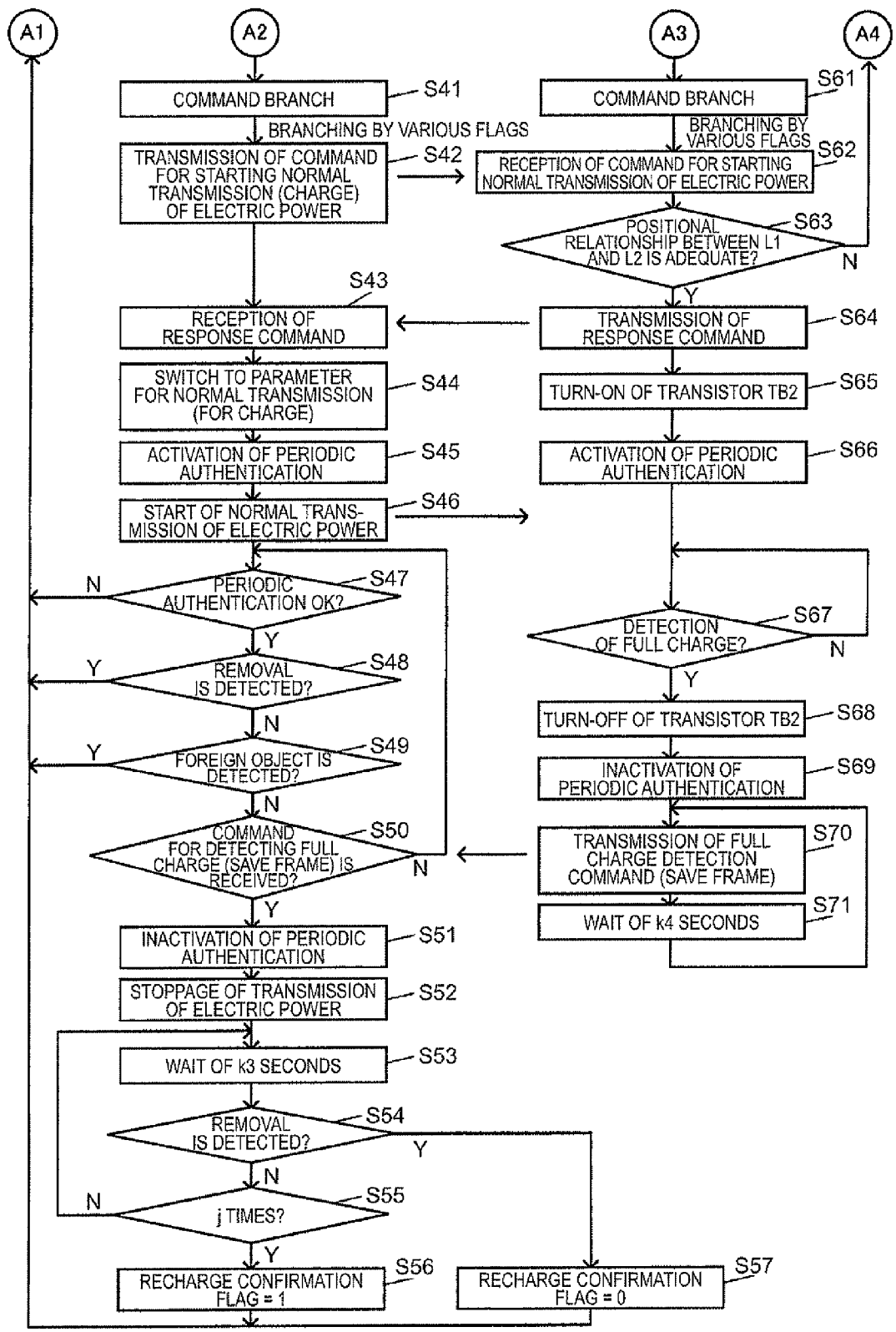
FIG. 13 is a flowchart for explaining an operation of an embodiment according to the invention.

Next, operations of the power transmission device 10 and the power reception device 40 are described in detail by using flowcharts shown in FIGS. 12 and 13.

Upon turning on the power source, after a wait time of k1 seconds (step S1), the power transmission device 10 performs preliminary transmission of electric power before starting the normal transmission of electric power (step S2). The preliminary transmission of electric power is temporary transmission of electric power for detecting placement (step S3) or a position of an electronic apparatus. Namely, the transmission of electric power is performed so as to detect whether or not the electronic apparatus is placed on the charging device as shown in the phase F2 in FIG. 7 or whether or not the electronic apparatus is placed on an adequate position in the placement. The driving frequency (the frequency of the driving clock output from the driving clock generation circuit 25) in the preliminary transmission of electric power is set to, for example, frequency f1.

By the preliminary transmission of electric power from the power transmission device 10, the power reception device 40 is turned on (step S22) and a reset state of the power reception control device 50 is cancelled. As a result, the power reception control device 50 sets the signal P1Q shown in FIG. 10 to an H level. Hereby, the transistor TB2 of the power supply control section 48 is turned off (step S23) so that electric connection between the regulator 49 and the load 90 is disconnected.

Next, the power reception device 40 determines adequacy of the positional relationship (a position level) between the primary coil L1 and the secondary coil L2 by using the position detection circuit 56 (step S24). When the positional relationship is inadequate, the power reception device 40 waits for a time period of, for example, k2 seconds (step S21).

On the other hand, when the positional relationship is adequate, the power reception device 40 generates the negotiation frame and transmits it to the power reception device 40 (step S25). To be specific, the negotiation frame is transmitted by the load modulation as described above with reference to FIG. 11B. The negotiation frame includes the matching code such as, for example, information about the standard or information about the coil stored in the storage section 53 at the power receiving side, and hardware information such as information about the system (a load condition detection technique), or information about a threshold value (a threshold value for detection of a load condition).

When the power transmission device 10 receives the negotiation frame (step S4), the power transmission device 10 inspects the negotiation frame (step S5). To be specific, the power transmission device 10 determines whether or not the information about the standard, coil or system stored in the storage section 23 at the power transmitting side is matched to the information about the standard, coil or system received from the power reception device 40. When it is determined that the negotiation frame is adequate, detection of a foreign object is performed (step S6).

To be specific, the power transmission device 10 sets the driving frequency to be a foreign object detection frequency f3. The power transmission device 10 performs primary detection of a foreign object before starting the normal transmission of electric power on the basis of the information about the threshold value (the information about the threshold value on safety) and determines whether or not the load condition at the power receiving side is adequate. For example, the power transmission device 10 makes a foreign object detection enable signal to be active so as to instruct the load condition detection circuit 30 to start the performing of foreign object detection. The foreign object detection is achieved such that, for example, information about a detected load condition (the pulse width information) output from the load condition detection circuit 30 is compared with the threshold value (META) for detection of a load condition. After a time period for detecting a foreign object is over, the power transmission device 10 returns the driving frequency to the normal power transmission frequency f1.

When it is determined that the negotiation frame is inadequate in the step S5 or a foreign object is detected in the step S6, the power transmission device 10 stops the transmission of electric power and returns to the step S1.

Next, the power transmission device 10 generates the negotiation frame and transmits it to the power reception device 40 (step S7). The negotiation frame includes for example, the information about the standard, information about the coil, and information about the system stored in the storage section 23 at the power transmitting side.

When the power reception device 40 receives the negotiation frame (step S26), the power reception device 40 performs the inspection of the negotiation frame (step S27). To be specific, the power reception device 40 determines whether or not the information about the standard, coil or system stored in the storage section 53 at the power receiving side is matched to the information about the standard, coil or system received from the power transmission device 10. When it is determined that the negotiation frame is adequate, the power reception device 40 generates a set-up frame and transmits it to the power transmission device 10 (step 28). The set-up frame includes parameter data such as information about the transmission condition or information about the adaptable function. Here, the information about the transmission condition includes the driving voltage or the driving frequency of the primary coil. The information about the adaptable function includes information indicative of a function added for each application. In a case where the set-up frame is inadequate, the power transmission device 10 moves to the step 21.

When the power transmission device 10 receives the set-up frame (step S8), the power transmission device 10 performs inspection of the set-up frame (step S9). In a case where the set-up frame received from the power reception device 40 is adequate, the power transmission device 10 generates the set-up frame and transmits it to the power reception device 40 (step S10). On the other hand, when the set-up frame is adequate, the power transmission device 10 stops the transmission of electric power and returns to the step S1.

When the power reception device 40 receives the set-up frame (step S29), the power reception device 40 performs inspection of the set-up frame (step S30). In a case where the set-up frame is adequate, the power reception device 40 generates the start frame and transmits it to the power reception device 40 (step S31). On the other hand, when the set-up frame is inadequate, the power reception device 40 returns to the step S21.

When the power reception device 40 transmits the start frame to the power transmission device 10 (step S31), the power reception device 40 moves to a command branch (step S61). When the power transmission device 10 receives the start frame from the power reception device 40 (step S11), the power transmission device 10 moves to a command branch (step S41). Namely, command interpretation is performed and each of the power transmission device 10 and power reception device 40 branches to a process according to a certain one of various flags.

To be specific, in a case where there is not a command requiring a prioritized process (e.g., an interruption command), the power transmission device 10 transmits a command for starting the normal transmission (charge) to the power reception device 40 (step S42). When the power reception device 40 receives the command for starting the normal transmission (step S62), the power reception device 40 determines whether or not the positional relationship between the primary coil L1 and the secondary coil L2 is adequate (step S63) When the positional relationship is adequate, the power reception device 40 transmits a response command to the power transmission device 10 (step S64).

When the power transmission device 10 receives the response command (step S43), the power transmission device 10 switches various parameters to parameters for the normal transmission of electric power (step S44). To be specific, parameters for the transmission condition and the like are switched to parameters set in the set-up process. The power transmission device 10 activates the periodic authentication (step S45), and starts the normal transmission of electric power (step S46).

After the power reception device 40 transmits the response command (step S64), the power reception device 40 turns on the transistor TB2 of the power supply control section 48 (step S65) and starts the supplying of electric power to the load 90. The power reception device 40 activates the periodic authentication and performs periodic load modulation (step S66). To be specific, the power reception device 40 turns on or off, in a predetermined pattern, the transistor TB3 of the load modulation section 46 during the term of periodic authentication.

After starting the normal transmission of electric power, the power transmission device 10 performs detection of a takeover condition due to a metallic foreign object having a large area during the term of periodic authentication by the periodic load modulation (step S47). The power transmission device 10 performs the detection of removal and the detection of a foreign object (step S48, step S49). When takeover, removal, or a foreign object is detected in the periodic authentication, the power transmission device 10 stops the transmission of electric power and returns to the step S1.

After the normal transmission of electric power is started, the power reception device 40 checks whether or not the battery 94 is in the full charge state (step S67). When the full charge state is detected, the power reception device 40 turns off the transistor TB2 (step S68) and stops the supplying of electric power to the load 90. In addition, the power reception device 40 inactivates the periodic authentication (step S69). The power reception device 40 transmits a full charge detection command (the save frame) for notifying the power transmission device 10 of the full charge (step S70). After taking a wait time period of k4 seconds (step S71), the power reception device 40 repeats the process of the step S70.

When the power transmission device 10 receives the full charge detection command (the save frame)(step S50), the power transmission device 10 inactivates the periodic authentication and stops the transmission of electric power (step S51 and step S52). After detecting the full charge state, the power transmission device 10 moves to the standby phase (step S53).

In the standby phase after the detection of full charge, the power transmission device 10 performs the detection of removal, for example, one time for every k3 seconds (step S54). When detecting the removal, the power transmission device 10 resets the recharge confirmation flag to be "0" (step S57) to stop the transmission of electric power, and returns to the step S1.

In the standby phase after the detection of full charge, the power transmission device 10 performs confirmation of recharge one time for every (k3×j) seconds, sets the recharge confirmation flag to be "1" (steps S55 and S56) to stop the transmission of electric power, and returns to the step S1. In this instance, the negotiation process and the set-up process are carried out. In the command branch of the step S41, since the recharge confirmation flag is "1", the power transmission device 10 moves to a process of the recharge confirmation command.

8. Coil Parameter

Figure 14A:
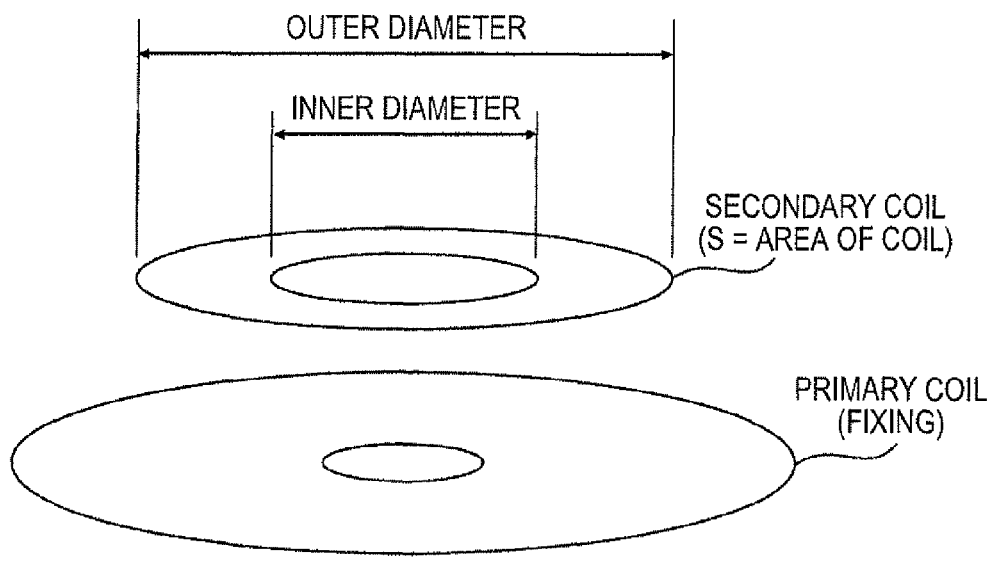
FIGS. 14A and 14B are explanatory views for describing coil parameters according to an embodiment of the invention.
Figure 14B:
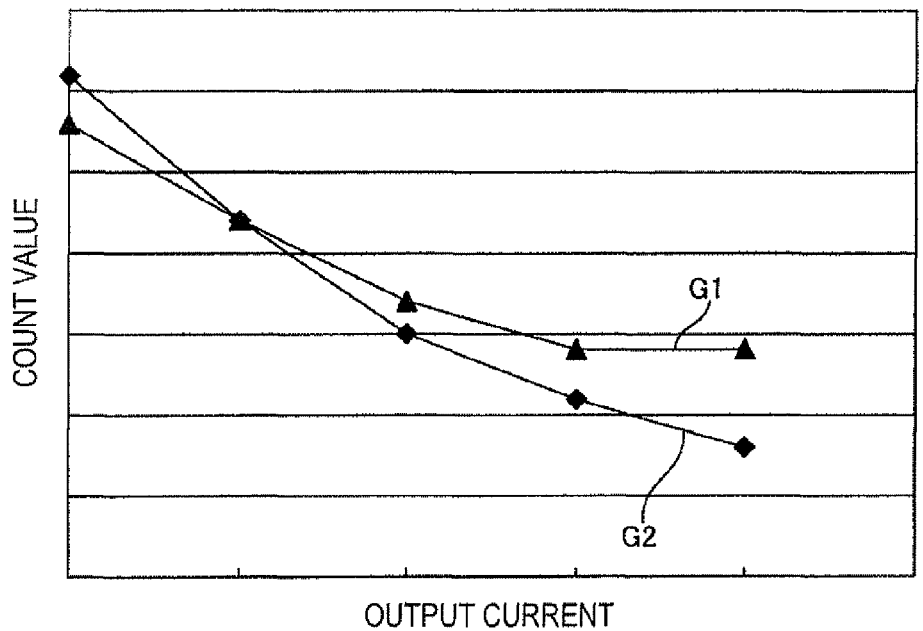

FIGS. 14A and 14B are explanatory views for describing coil parameters. As shown in FIG. 14A, the coil parameters indicative of characteristics of the coil include an inner diameter, an outer diameter and a coil area of the coil. Here, measuring was carried out by preparing one coil having fixed coil parameters as the primary coil and a plurality of coils having different coil parameters as the secondary coils.

Figure 15A:
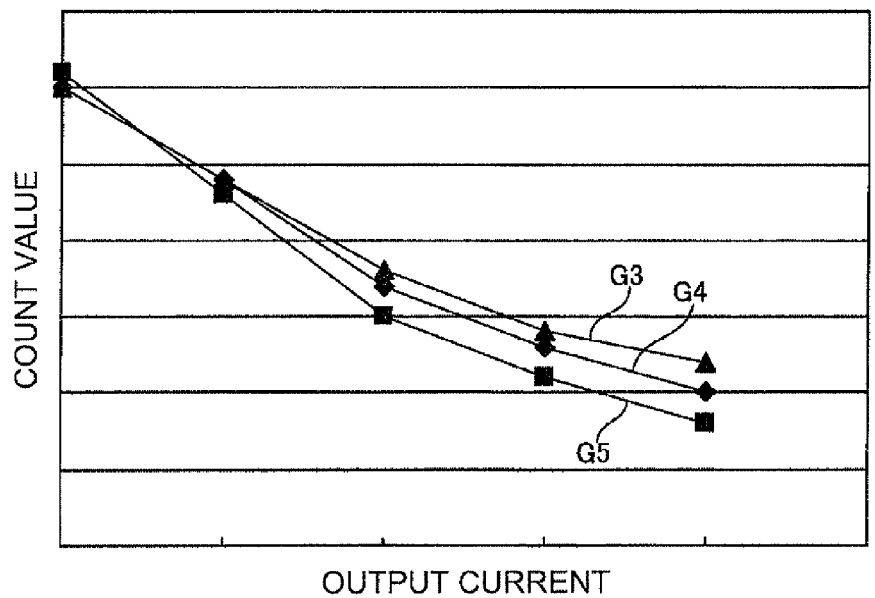
FIGS. 15A and 15B are explanatory views for describing coil parameters according to an embodiment of the invention.

FIG. 14B is a graph showing a relationship between measured values of count values in the pulse width detection and output current values (the load) in a case where the inductance was adjusted so as to make the output voltages to be the same. A curve G1 is formed by measured values in a case where the secondary coil had a small coil area, and a curve G2 is formed by measured values in a case where the secondary coil had a large coil area. FIG. 15A is a graph showing a relationship between measured values of count values in the pulse width detection and output current values in a case where the inductance was adjusted by the secondary coils having the same outer diameters. A curve G3 is formed by measured values in a case where the secondary coil had a small coil area, and a curve G4 is formed by measured values in a case where the secondary coil had an intermediate coil area.

As shown in FIG. 14B and FIG. 15A, in a case where the secondary coil had a small coil area, a fluctuation range of the count values in the pulse width detection with respect to fluctuation of the load was decreased. Therefore, in a case, for example, the coil area of the secondary coil is changed in accordance with a size of an electronic apparatus, it is enough to set the threshold value by taking into account the fluctuation characteristic of the count values in FIG. 14B and FIG. 15A.

Figure 15B:
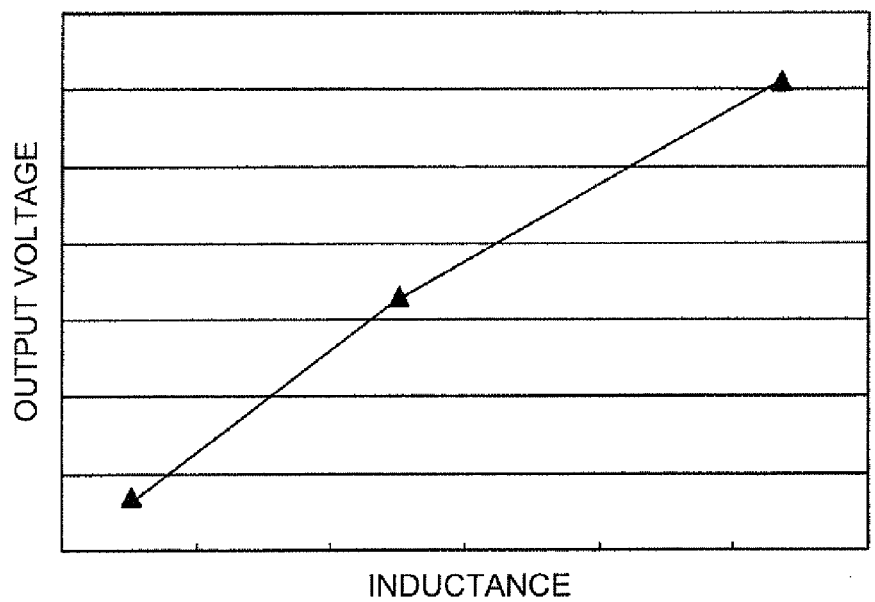

FIG. 15B is a graph showing a relationship between the inductance and the output voltage of each of the secondary coils having the same outer diameters. As shown in FIG. 15B, by changing the inductance, the output voltage (the supply voltage VOUT to the load) can be varied so that it is possible to increase output variations of the coils.

Thus, the characteristics such as the threshold value or the output voltage are changed in accordance with coil parameters of the secondary coil. As a result, in a case where a plurality of secondary coils having different coil parameters are correlated to one primary coil as shown in FIG. 3, the power reception device 40 transmits information about the threshold value or the output voltage according to the coil parameters to the power transmission device 10, thereby it is possible to achieve the contactless power transmission system optimally adjusted.

While the embodiment of the invention is described in detail as the above, it will be readily understood by a person skilled in the art that numerous modifications or changes can be made without departing from the spirit or scope of the invention. Therefore, these modifications or changes are included within the scope of the invention. For example, a word which is used at least one time in the descriptions or drawings and is described together with a different wide or synonymous word can be replaced with the different word at any portion in the descriptions or drawings. All the combinations between the embodiments and changes or modifications are included within the scope of the invention. Each of structures and operations of the power transmission control device, the power transmission device, the power reception control device, the power reception device, the collating method of the information about the coil, the methods of the negotiation, set-up and command processes and the method of detection of the load condition is not limited to the described embodiment, but can be variously changed or modified.

What is claimed is:

1. A power transmission control device in a contactless power transmission system that supplies electric power to a load of a power reception device such that a primary coil and a secondary coil are electromagnetically coupled to each other so as to transmit the electric power to the power reception device from a power transmission device, the power transmission control device comprising:
   a controller that controls the power transmission control device; and
   a storage section that stores information about a power transmitting side coil,
   the controller collating the information about the power transmitting side coil with information about a power receiving side coil received from the power reception device, and the controller determining whether or not the information about the power transmitting side coil is compatible with the information about the power receiving side coil.

2. The power transmission control device according to claim 1,
   the storage section storing first identification information about the primary coil provided to the power transmission device as the information about the power transmitting side coil, the controller determining that the information about the power transmitting side coil is compatible with the information about the power receiving side coil in a case where the information about the power transmitting side coil is matched to the information about the power receiving side coil, and the information about the power receiving side coil is second identification information that is the identification information about the primary coil to which the power reception device is adaptable.

3. The power transmission control device according to claim 1,
   the controller transmitting the information about the power transmitting side coil stored in the storage section to the power reception device m a case where it is determined that the information about the power transmitting side coil is compatible with the information about the power receiving side coil.

4. The power transmission control device according to claim 3,
   the controller detecting a foreign object before transmitting the information about the power transmitting side coil to the power reception device, and the controller transmitting the information about the power transmitting side coil to the power reception device in a case where the foreign object is not detected.

5. The power transmission control device according to claim 3,
   the storage section storing a plurality of pieces of information about the power transmitting side coil, and the controller transmits, to the power reception device, information about the coil that is selected from the plurality of pieces of information about the power transmitting side coil and is compatible with the information about the power receiving side.

6. The power transmission control device according to claim 1,
   the controller collating the information about the power transmitting side coil with the information about the power receiving side coil before starting normal transmission of electric power to the power reception device from the power transmission device, and starts the normal transmission of electric power in a case where it is determined that the information about the power transmitting side coil is compatible with the information about the power receiving side coil.

7. A power transmission device comprising:
   the power transmission control device according to claim 1; and
   a power transmission section that generates an alternating current (AC) voltage and supply the AC voltage to the primary coil.

8. An electronic apparatus, comprising:
   the power transmission device according to claim 7.

9. A power reception control device that is in a contactless power transmission system that causes a power transmission device to transmit electric power to a power reception device so as to supply the electric power to a load of the power reception device by electromagnetically coupling a primary coil to a secondary coil, the power reception control device comprising:
   a controller that controls the power reception control device; and
   a storage section that stores information about a power receiving side coil,
   the controller transmitting the information about the power receiving side coil stored in the storage section to the power transmission device.

10. The power reception control device according to claim 9,
    the storage section storing identification information about the primary coil as the information about the power receiving side coil to which the power reception device is adaptable, and the controller transmitting the identification information about the primary coil to the power transmission device.

11. The power reception control device according to claim 10, in a case where first to N-th types of secondary coils are adaptable to a first type of primary coil and the secondary coil of the power reception device is either one of the first to N-th types of the secondary coils, the controller transmitting the identification information about first type of the primary coil as the information about the power receiving side coil.

12. The power reception control device according to claim 9, the controller collating information about a power transmitting side coil with the information about the power receiving side coil in a case where the controller receives the information about the power transmitting side coil from the power transmission device, and determines whether or not the information about the power transmitting side coil is compatible with the information about the power receiving side coil.

13. The power reception control device according to claim 9, the controller transmitting the information about the power receiving side coil to the power transmission device in a case where it is determined whether or not a positional relationship between the primary coil and the secondary coil is adequate and it is determined that the positional relationship is adequate.

14. The power reception control device according to claim 9, the controller transmitting the information about the power receiving side coil to the power transmission device before normal transmission of electric power to the power reception device from the power transmission device is started.

15. The power reception control device according to claim 9, the power reception device including a coil unit having the secondary coil mounted thereon and a control unit having the power reception control device mounted thereon, the coil unit being provided with a coil information recording section having the information about the power receiving side coil recorded therein, and the controller transmitting the information about the power receiving side coil recorded in the coil information recording section to the power transmission device.

16. A power reception device, comprising:

the power reception control device according to claim 9; and the power reception section that converts an induction voltage of the secondary coil to a direct current (DC) voltage.

17. A power reception device in a contactless power transmission system that receives electric power from a power transmission device so as to supply the electric power to a load of the power reception device by electromagnetically coupling a primary coil to a secondary coil, the power reception device comprising:

a coil unit having the secondary coil mounted thereon;

a control unit having the power reception control device mounted thereon; and a coil information recording section that has information about a power receiving side coil recorded therein and is provided to the coil unit, the power reception control device transmitting the information about the power receiving side coil recorded in the coil information recording section to the power transmission device.

18. The power reception device according to claim 17, identification information about the primary coil to which the power reception device is adaptable being recorded in the coil information recording section as the information about the power receiving side coil, and the power reception control device transmitting the identification information about the primary coil to the power transmission device.

19. An electronic apparatus comprising:

the power reception device according to claim 16; and a load to which electric power is supplied from the power reception device.

\* \* \* \* \*